(12) United States Patent
Files et al.

(10) Patent No.: US 10,719,145 B1
(45) Date of Patent: Jul. 21, 2020

(54) ENABLE SINGLE AND DUAL ACTIVE PENS ON A DUAL-SCREEN DEVICE

(71) Applicant: Dell Products L. P., Round Rock, TX (US)

(72) Inventors: Jace W. Files, Round Rock, TX (US); Yung-Chun Liu, Taipei (TW); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/398,609

(22) Filed: Apr. 30, 2019

(51) Int. Cl.
*G06F 3/0354* (2013.01)
*G06F 3/041* (2006.01)
*G06F 1/16* (2006.01)

(52) U.S. Cl.
CPC .......... *G06F 3/03545* (2013.01); *G06F 1/169* (2013.01); *G06F 1/1649* (2013.01); *G06F 3/0412* (2013.01); *G06F 3/0416* (2013.01)

(58) Field of Classification Search
CPC .... G06F 3/03545; G06F 3/044; G06F 3/0488; G06F 3/0416; G06F 3/0383
See application file for complete search history.

(56) References Cited

U.S. PATENT DOCUMENTS

| | | | | |
|---|---|---|---|---|
| 2010/0304793 | A1* | 12/2010 | Kim | G06F 1/1675 455/566 |
| 2014/0267339 | A1* | 9/2014 | Dowd | H04L 63/0428 345/581 |
| 2015/0091830 | A1* | 4/2015 | Miyazaki | G06F 3/04845 345/173 |
| 2017/0192549 | A1* | 7/2017 | Katayama | G06F 3/041 |
| 2019/0102021 | A1* | 4/2019 | Jang | G06F 3/0412 |
| 2019/0163320 | A1* | 5/2019 | Park | G06F 3/03545 |

* cited by examiner

*Primary Examiner* — Abbas I Abdulselam
(74) *Attorney, Agent, or Firm* — Campbell Stephenson LLP; Shiv S. Naimpally

(57) ABSTRACT

Touchscreen computing device having support for interference-free operation of one or two active pens. A dedicated screen ID and pen ID establish a one-to-one pairing between an active pen and a touchscreen of a single-screen or dual-screen device, thereby rejecting interference from additional pens or screens. For a dual-screen device, the screen-specific uplink signals are synchronized using master-slave, interlaced timing to avoid mutual interference and to support simultaneous operation of two active pens—one on each screen. The downlink signals from two active pens occur during the same timeslots, whereas the two uplinks—one from each of the two screens—are interleaved with two timeslots for pen downlinks. Screen-specific screen ID-twin parameter is created for each screen of a dual-screen device to alert a pen to send its downlink signals in the interleaved manner. For a dual-screen device, the uplink signals for single-pen or dual-pen configuration are activated based on the device orientation/orientation.

20 Claims, 9 Drawing Sheets

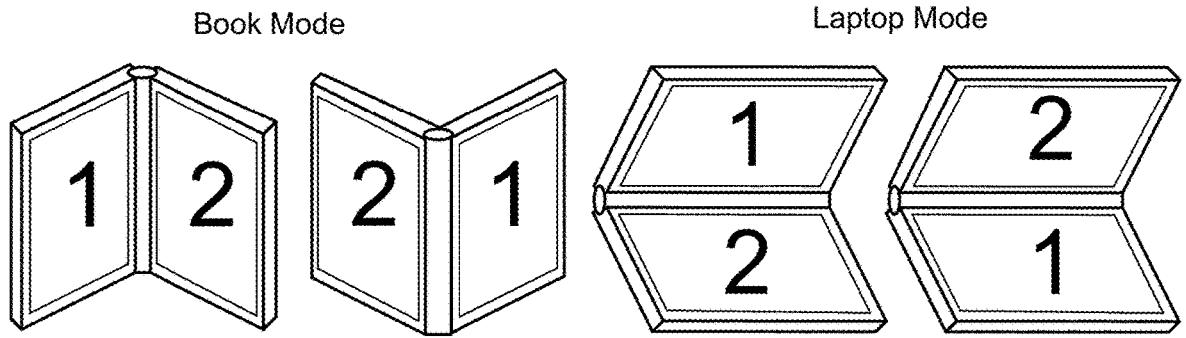
FIG. 7A   FIG. 7B   FIG. 7C   FIG. 7D
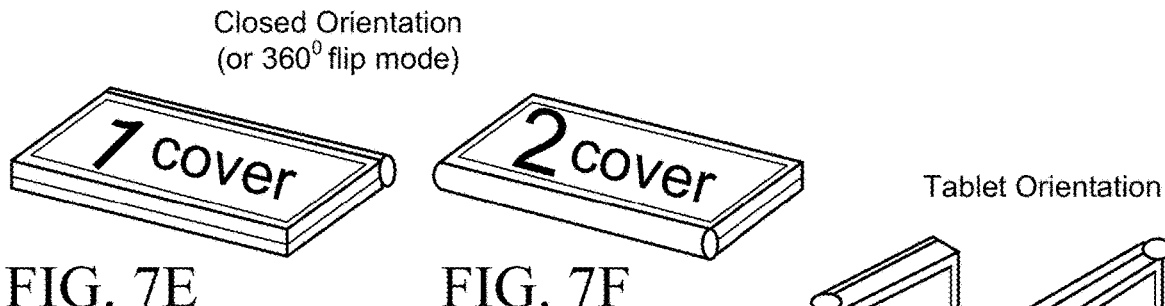
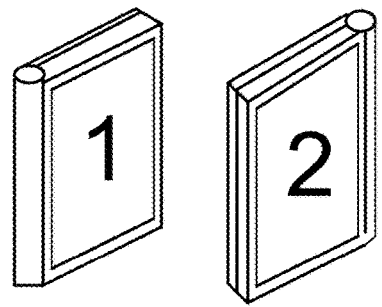
FIG. 7E   FIG. 7F   FIG. 7I   FIG. 7J
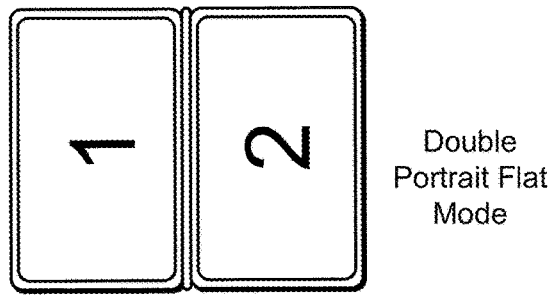
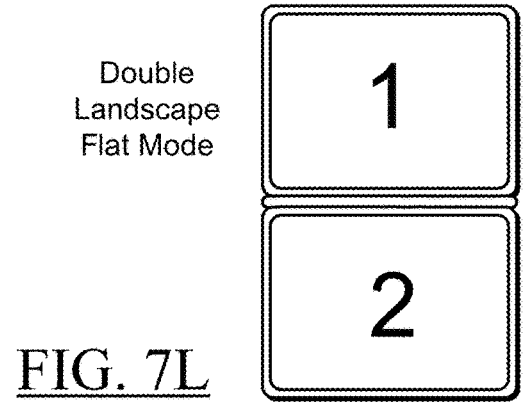
FIG. 7G   FIG. 7H   FIG. 7K   FIG. 7L

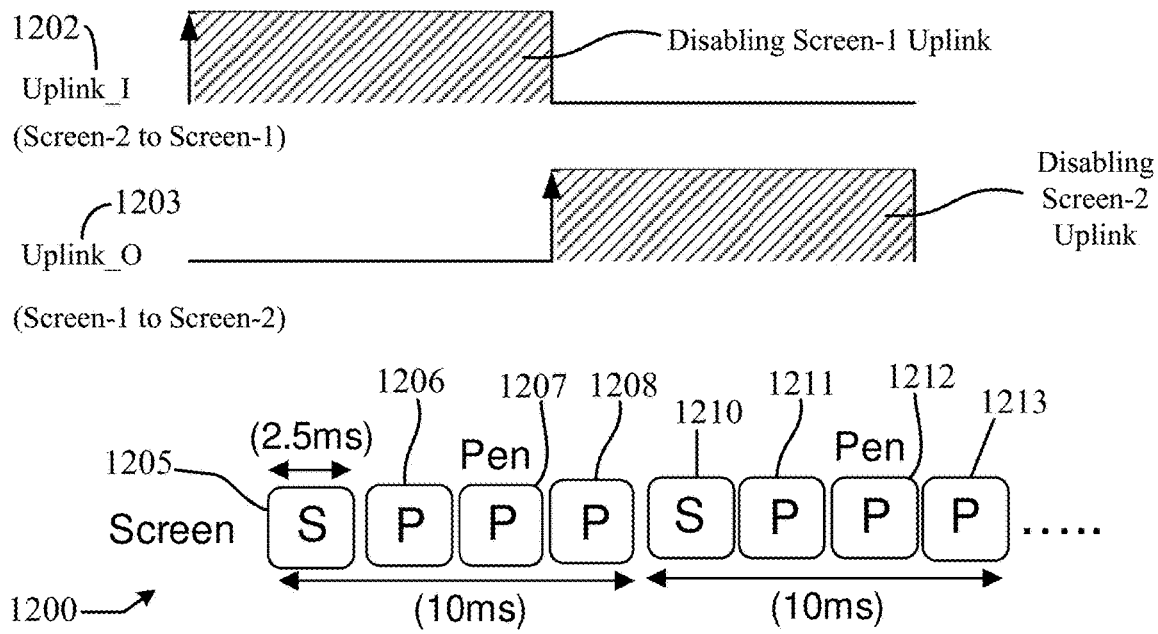
FIG. 12
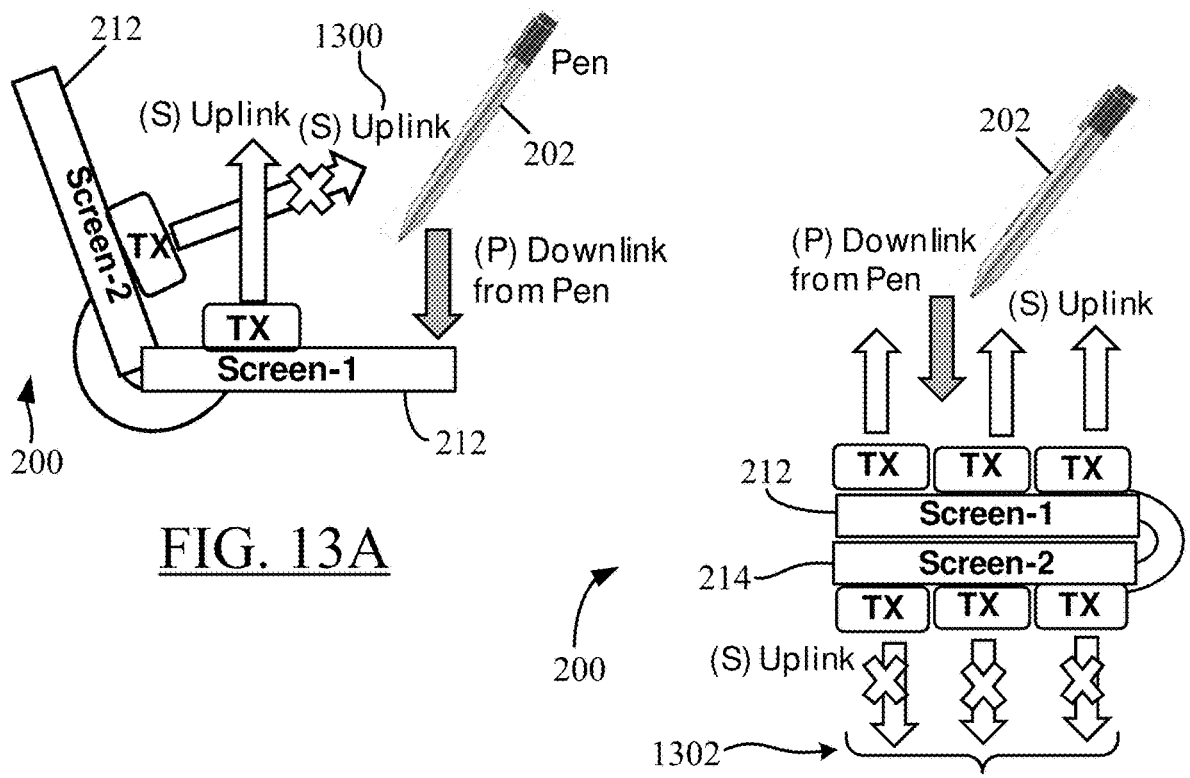
FIG. 13A
FIG. 13B

ENABLE SINGLE AND DUAL ACTIVE PENS ON A DUAL-SCREEN DEVICE

TECHNICAL FIELD

This disclosure relates generally to computing devices capable of receiving stylus-based (e.g., active pen) input and, more particularly, to supporting operation of a single as well as dual active pens on a dual touch-screen computing device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), User Equipments (UEs), corporate (or small business) server and data processing systems, and the like. These devices may vary in size, shape, performance, functionality, and price. In addition to supporting data processing and computing functionalities, almost all of these modern devices also offer wireless communication capabilities for voice, picture, video, and/or other data communication.

A touchscreen computing device, such as a tablet or a 2-in-1 device, may receive inputs from an active stylus (also referred to as an "active pen"), which includes electronic components and allows users to write directly onto the touch-screen surface of a Liquid Crystal Display (LCD) display associated with the computing device. An active pen may be used for digital note-taking, electronic document annotation, on-screen digital drawing or painting, as well as for accurate object selection and scrolling. When used in conjunction with handwriting recognition software, the active pen's handwritten input can be converted to digital text, stored in a digital document, and edited in a text or drawing application. Active pen protocols govern the design and functionality of active pens. Two such protocols include the Microsoft Pen Protocol (MPP) and the Wacom AES (Active Electrostatic) Protocol. Active pen protocols have been continuing to evolve to support additional functionalities.

With current active pen protocols, only one active stylus can be paired with a device at a time. Thus, current active pen technologies do not support dual active pens on a single device. For example, two users, each having their own active pen, are currently unable to interact with the same device. In addition, for a device that has dual display devices, the active pen is paired to a single display device and cannot, after providing input on a first display device, continue to provide input on a second display device. Thus, current active pen technologies do not support a single pen providing input to two (or more) display devices associated with the same computing device.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques are described herein for supporting interference-free operation of a single active pen as well as two active pens on a dual touch-screen computing device. For a single-screen device, the systems and techniques provide for interference-free operation of a single active pen in noisy environments, such as, for example, the presence of another screen transmitting its own Uplink (UL) signals in close proximity. The systems and techniques described herein use a dedicated screen identifier (ID) and pen ID mechanism to extend current active pen protocols to support dual touch screens for both a single active pen and dual active pens. The systems and techniques enable a one-to-one (1-1) pairing between an active pen and a touchscreen, thereby rejecting interference from additional pens or screens operating in the vicinity. Furthermore, in the case of particular device orientations of a dual-screen device, the screen-specific UL signals are synchronized using interlaced timing (in a master-slave configuration) to avoid interference and to support simultaneous operation of two active pens, e.g., one active pen interacting with each screen. In this approach, downlink (DL) signals from two active pens occur during the same timeslots, whereas the two uplinks— one from each of the two screens—are interleaved with two (2) timeslots allotted for pen downlinks. In addition, a screen-specific screen ID twin parameter is created for each screen of a dual-screen device to alert a pen approaching the dual-screen device that two UL signals having interlaced timing are in use and to send DL signals accordingly. In case of a dual-screen device, the decision to activate the UL signals for a single-pen or dual-pen configuration is based on the device orientation to provide an interference-free operation.

In one embodiment, a computing device, comprises: (i) a touch-sensitive display screen operable to enable a user to interact therewith using an active pen having a pen ID specific to the active pen and (ii) a screen sensor operatively coupled to the display screen to sense and analyze user input received through the active pen, wherein the screen sensor is operable to wirelessly transmit a screen ID specific to the display screen to the active pen using an Uplink (UL) signal and wirelessly receive the pen ID using a Downlink (DL) signal from the active pen, thereby establishing a one-to-one pairing between the active pen and the display screen.

In another embodiment, the present disclosure is directed to a computing device that comprises: (i) a first touch-sensitive display screen operable to allow a first user to interact therewith using a first active pen; and (ii) a second touch-sensitive display screen movably attached to the first display screen and operable to allow a second user to interact therewith using a second active pen while the first user is interacting with the first display screen.

In a further embodiment, the present disclosure is directed to an active pen that is operable to allow a user to interact with a first touch-sensitive display screen. The active pen comprises: (i) a transceiver to wirelessly communicate with the first touch-sensitive display; and (ii) a controller coupled to the transceiver. In the active pen, the controller is operable to: (a) wirelessly transmit a pen ID specific to the active pen through the transceiver to the first display screen using a Downlink (DL) signal and wirelessly receive through the transceiver a first screen ID specific to the first display screen in a first Uplink (UL) signal from the first display screen, (b) establish a one-to-one pairing between the active pen and the first display screen, and (c) ignore a second screen ID received through the transceiver in a second UL signal from a second touch-sensitive display screen in a vicinity (e.g., within a pre-determined distance) of the active pen while the one-to-one pairing remains established.

In yet another embodiment, the present disclosure is directed to a method, which comprises: (i) wirelessly transmitting, by a dual-screen computing device, a first screen ID specific to a first touch-sensitive display screen of the computing device; (ii) wirelessly transmitting, by the dual-screen computing device, a second screen ID specific to a second touch-sensitive display screen of the computing device, wherein the second screen ID is related to the first screen ID; (iii) wirelessly receiving, by the dual-screen computing device, a first pen ID specific to a first active pen in vicinity of the computing device; (iv) wirelessly receiving, by the dual-screen computing device, a second pen ID specific to a second active pen in vicinity of the computing device; (v) linking, by the dual-screen computing device, the first screen ID with the first pen ID to establish a one-to-one pairing between the first active pen and the first display screen; and (vi) linking, by the dual-screen computing device, the second screen ID with the second pen ID to establish a one-to-one pairing between the second active pen and the second display screen.

The system techniques described herein provide extensions to the active pen protocols to enable simultaneous operations of two active pens on a dual-screen computing device (or information handling system)—one active pen on each screen. The synchronization of uplinks from the two screens along with the interleaved downlinks from the two active pens using a master-slave based inter-laced timing arrangement allow for such simultaneous operation of two active pens without interference. Furthermore, the 1-1 pairing of a pen ID and a screen ID enable information (e.g., parameters) to be exchanged between a pen and a screen sensor without interference from other pens or screens operating in the vicinity. As a result, a single active pen can work with a single-screen device or a dual-screen device, and two active pens can simultaneously work on the two screens of a dual-screen device in noisy environments (e.g., environments in which multiple users are using active pens).

BRIEF DESCRIPTION OF THE DRAWINGS

A more complete understanding of the present disclosure may be obtained by reference to the following Detailed Description when taken in conjunction with the accompanying Drawings. In the figures, the leftmost digit(s) of a reference number identifies the figure in which the reference number first appears. For ease of discussion, the same reference numbers in different figures indicate similar or identical items.

FIG. 5 is an exemplary architectural block diagram of an active pen (or active stylus) according to some embodiments of the present disclosure.

FIGS. 7A-7L illustrate exemplary orientations of a dual-screen computing device in different exemplary operating modes that may be taken into account for single-pen versus dual-pen uplink activation decision according to certain embodiments of the present disclosure.

FIG. 12 is an exemplary UL-DL timing diagram for the single-pen application in a dual-screen device as per certain embodiments of the present disclosure.

FIGS. 13A-13B illustrate two additional single-pen orientations for the dual-screen computing device of FIG. 2 in which the trigger-based timing of FIG. 12 may be used to enable a screen-pen pair to operate free of interference from the other screen of the device as per particular embodiments of the present disclosure.

DETAILED DESCRIPTION

Figure 1:
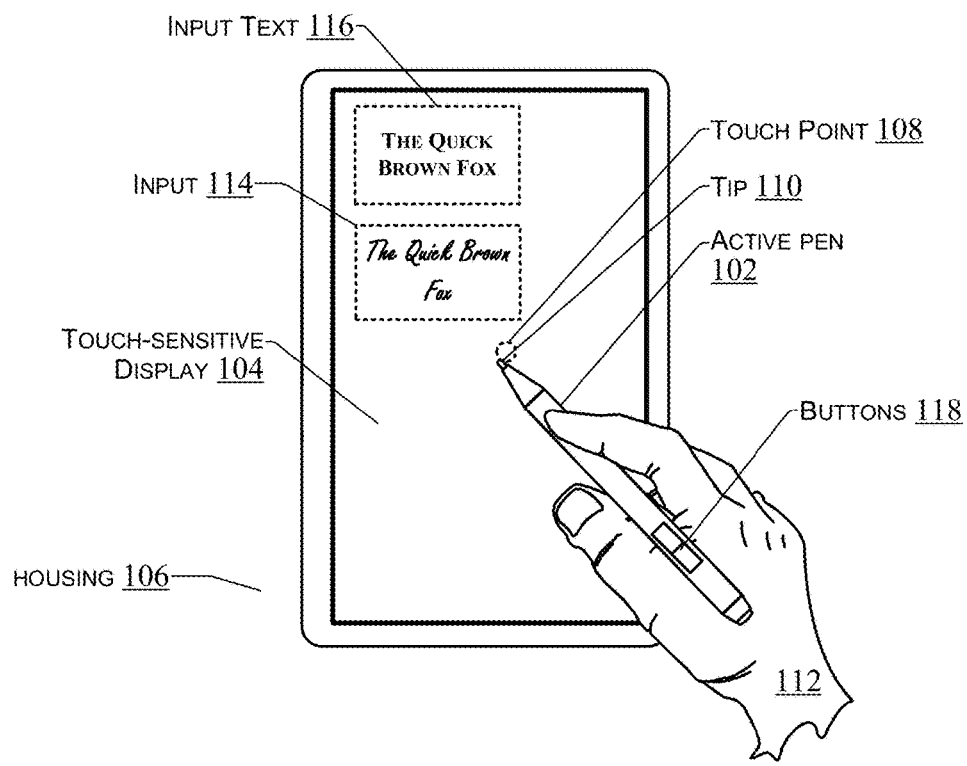
FIG. 1 shows an exemplary single-screen computing device along with an active pen according to certain embodiments of the present disclosure.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

In the discussion below, the terms "computing device" or "mobile unit" may be used interchangeably to refer to a portable computing unit—having a single touchscreen or two touchscreens—with wireless communication capability. In particular embodiments, such a unit may be the above-mentioned information handling system. For example, as mentioned before, a computing device or mobile unit may be a personal computer (e.g., a laptop), tablet computer, mobile device (e.g., personal digital assistant (PDA) or smart phone), a UE, or any other suitable device, and may vary in size, shape, performance, functionality, and price. Furthermore, the terms "active pen" and "active stylus" also may be used interchangeably herein. It is noted that various figures (including component diagrams) shown and discussed herein are for illustrative purpose only, and are not drawn to scale. Similarly, various waveforms and timing diagrams are shown for illustrative purpose only.

It is noted here that, for ease of discussion, a unit or module may be referred to as "performing," "accomplishing," or "carrying out" a function or process. The unit may be implemented in hardware and/or software. However, it is evident to one skilled in the art that such performance may be technically accomplished by a processor when appropriate software or program code is executed by the processor. The program execution would cause the processor to perform the tasks or steps instructed by the software to accomplish the desired functionality or result. However, for the sake of convenience, in the discussion below, a processor or software component may be interchangeably considered as an "actor" performing the task or action described, without technically dissecting the underlying software execution mechanism. Furthermore, a hyphenated term (e.g., "screen-specific", "touch-screen", "dual-screen", etc.) may be occasionally interchangeably used with its non-hyphenated version (e.g., "screen specific," "touchscreen", "dual screen", etc.), and a capitalized entry (e.g., "Active Pen", "Screen ID", "Uplink", etc.) may be interchangeably used with its non-capitalized version (e.g., "active pen", "screen ID", "uplink", etc.). Such occasional interchangeable uses shall not be considered inconsistent with each other.

The active pen protocol is extended to include an Uplink (UL) interface from the system sensor to the active pen to set the active pen in a particular mode prior to making contact with a touch-screen display device. The UL enables for additional pen features such as pen tilt awareness. The addition of the UL interface to the active pen protocols enables establishment of communication between an active pen and a system sensor—such as, for example, a touch-screen sensor in a single-screen tablet—to set the pen in a particular mode of operation prior to making contact with the screen and enable the screen to offer additional pen features such as, for example, pen tilt awareness. The UL signals from the screen sensor to the active pen and the DL signals from the pen to the sensor are transmitted wirelessly using Radio Frequency (RF) bands associated with a wireless technology such as, for example, Bluetooth®, ZigBee, or other similar technology.

The UL interface can cause multiple interference issues for a single-screen as well as a dual-screen computing device (or mobile units). For example, currently, an active pen synchronizes ("syncs") to whichever uplink it receives first. Therefore, the presence of another similar screen—whether as part of another single-screen device (e.g., a second device) or the second screen of a dual-screen device—in the proximity of the pen may create RF interference, which may cause the pen and its controller (for example, the original screen sensor) to get confused and compromise the inking experience. Similarly, in the case of a dual-screen device, when inking near the center gap (at a screen location close to the hinge) between the two display devices, the inking may become inconsistent because of the interference caused by the UL signaling of the second screen in the vicinity of the center gap. For example, the pen may be synced to a first screen, while the user may desire to write on a portion of the second screen close to the center gap/hinge.

It is therefore desirable to extend the active protocol to avoid the interference issue caused by the Uplink interface and enable correct operations of active pens in noisy environments, such as when another similar screen is in close proximity. In that regard, in the case of a dual-screen device, it is also desirable to enable simultaneous operation of two active pens—one on each screen—to enable the inking potential offered by the two available screens.

The systems and techniques described herein enable a single active pen as well as a dual active pen to operate, without interference issues, on a dual-screen device in noisy environments (e.g., in which other pens and other devices are being used). In the case of a single-screen computing device, the 1-1 pairing systems and techniques discussed herein enable a user to use an active stylus with the computing device without compromising the inking experience due to interference caused by the presence of similar screens operating in the vicinity.

FIG. 1 shows an exemplary single-screen computing device 100 along with an active pen 102 according to certain embodiments of the present disclosure. The computing device 100 and the active pen 102 may wirelessly communicate and link their respective IDs (identifiers) as per teachings of the present disclosure (discussed in more detail later) to enable 1-1 pairing of the device 100 and the pen 102, thereby allowing the pen 102 to operate interference-free in noisy environments. In one embodiment, the computing device 100 may be a tablet computer having a single, touch-sensitive display screen (also known as a touch-screen display device) 104 located within a housing 106. The touch-sensitive display screen 104 may use a capacitive or other similar touch-sensitive technology. A screen/pen sensor (not shown) may be embedded into the display screen 104 or located within the housing 106 to detect a touch point 108 of a tip 110 of the active stylus 102. The user may manipulate the active stylus 102, for example, by holding the stylus 102 in the user's hand 112. At least a portion of the input 114 received from the user manipulating the stylus 102 may be converted into input text 116. For example, the input 114 may include cursive or printed letters, numbers, and the like. An Optical Character Recognition (OCR) technique (or a similar technique) may be used to recognize the characters in the input 114 to create the input text 116. An application may store the input 114, the input text 116, or portions of both in an internal or external storage/memory (not shown). The user may provide a particular instruction to the active pen 102 using one or more of the buttons 118. In response, the active pen 102 may perform one or more actions, such as launching a particular application (e.g., drawing application, note taking application, or the like) to receive the input 114 from the stylus 102. In some cases, the particular instruction may cause (1) the computing device 100 to transition to a power-on from a low power state (e.g., power-off state, hibernate state, or the like) or to transition from the low power state to the power-on state, (2) launch one (or more) applications, or (3) perform another action that computing device is 100 is capable of performing.

Figure 2:
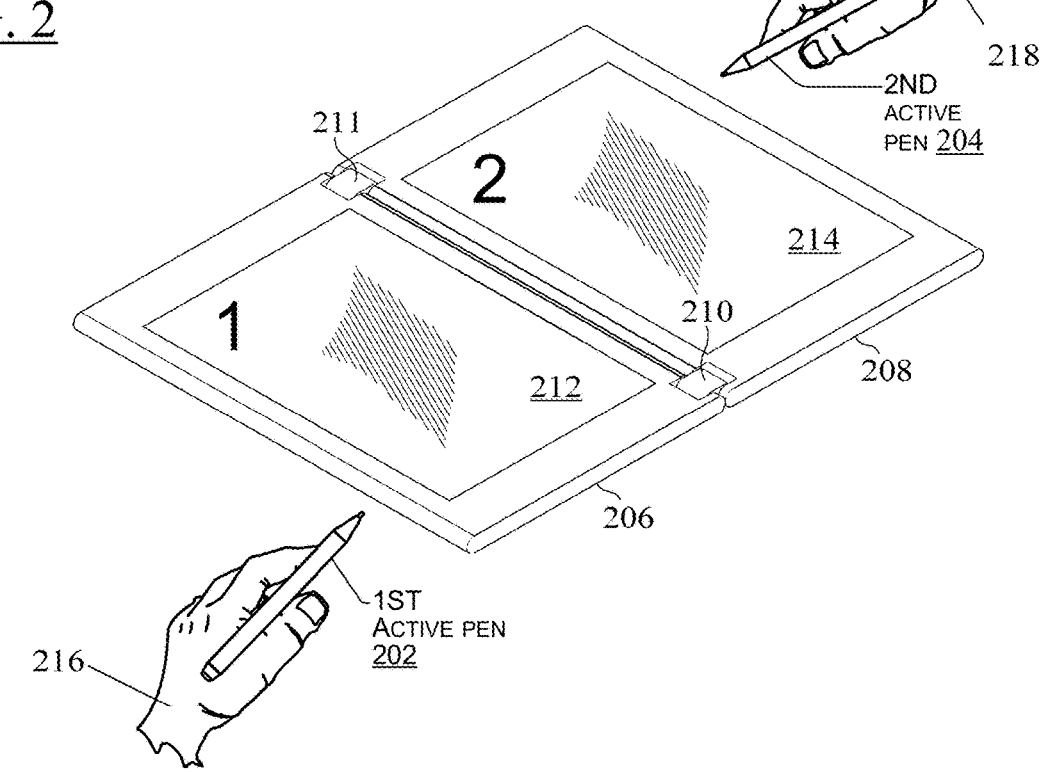
FIG. 2 is a perspective view of an exemplary dual-screen computing device and a pair of active pens according to some embodiments of the present disclosure.

FIG. 2 is an exemplary perspective view of a dual-screen computing device 200 and a pair of active pens 202, 204 according to some embodiments of the present disclosure. In some cases, the computing device 200 may include a first housing 206 coupled to a second housing 208 using one or more hinges, two of which are identified in the embodiment of FIG. 2 using reference numerals "210" and "211". The first housing 206 may include a corresponding first touch-sensitive display screen (or touch-screen display) 212 and the second housing 208 may include a corresponding second touch-sensitive display screen (or touch-screen display) 214. In certain embodiments, the display screens 212 and 214 may be capacitive touchscreens and may be substantially identical in construction and operation. These display screens are also identified in FIG. 2 using bigger size numbers "1" and "2" written in bold inside the corresponding display. The hinges 210-211 may enable the two housings 206, 208 to be positioned at different angles (e.g., between 0 and 360 degrees) relative to each other in different orientations (e.g., vertical orientations and horizontal orientations). Of course, additional housings may be attached via additional hinges to create a computing device with multiple housings.

As discussed later with reference to FIG. 4, a first portion of the components of the computing device 200 may be located in the first housing 206 (e.g., behind the first display screen 212) while a remaining portion of the components of the computing device 200 may be located in the second housing 208 (e.g., behind the second display screen 214). Each screen of the computing device 200 and the corresponding active pen may wirelessly communicate and link their respective IDs (identifiers) as per teachings of the present disclosure (discussed in more detail later) to enable 1-1 pairing of the screen and the pen. Furthermore, the interlaced timing of screen-specific uplink signals as per teachings of the present disclosure (also discussed in more detail later) ensures synchronization of UL signals from the screens and DL signals from the pens, thereby allowing simultaneous operation of two pens 202, 204 without interference.

In some cases, a first user and a second user may simultaneously provide input using the first active stylus 202 and the second active stylus 204, respectively. For example, the first user and the second user may collaborate on a particular project and both may use the computing device 200 to provide input. To illustrate, the first user may create notes while the second user creates drawings. As another illustration, both users may collaborate on a drawing. As a further illustration, both users may provide notes (such as the input 114 of FIG. 1), with the first user entering a first portion of the notes and the second user entering a second portion of the notes. The first user may manipulate the active stylus 202, for example, by holding the stylus 202 in the first user's hand 216. Similarly, the second user may manipulate the active stylus 204, for example, by holding the stylus 204 in the second user's hand 218. The first user may use the first active stylus 202 to provide first input to the computing device 200. Substantially at the same time, the second user may use the second active stylus 204 to provide second input to the computing device 200. For example, as illustrated in FIG. 2, the stylus 202 may be used on the first display screen 212 to provide the first input and the stylus 204 may be used on the second display screen 214 to provide the second input. In some embodiments, the same user may write on both of the screens 212, 214 using one of the active pens 202, 204 on each screen.

Note that the illustrations in FIGS. 1-2 are simplified to show only those details that are relevant to the present disclosure. Thus, for example, audio speakers, camera(s), a power button, one or more slots to connect external memory units such as a Universal Serial Bus (USB) drive or a Secure Digital (SD) or microSD memory card, one or more sockets for audio-video (AV) jacks, and the like, which are typically present in modern computing devices or mobile units, are not shown in FIGS. 1-2 for ease of illustration and to avoid depiction of components that not relevant to the present discussion. However, it should be understood that the computing devices 100, 200 may include these and other such components or features as are typically present in modern computing devices such as tablets or 2-in-1 devices.

Figure 3:
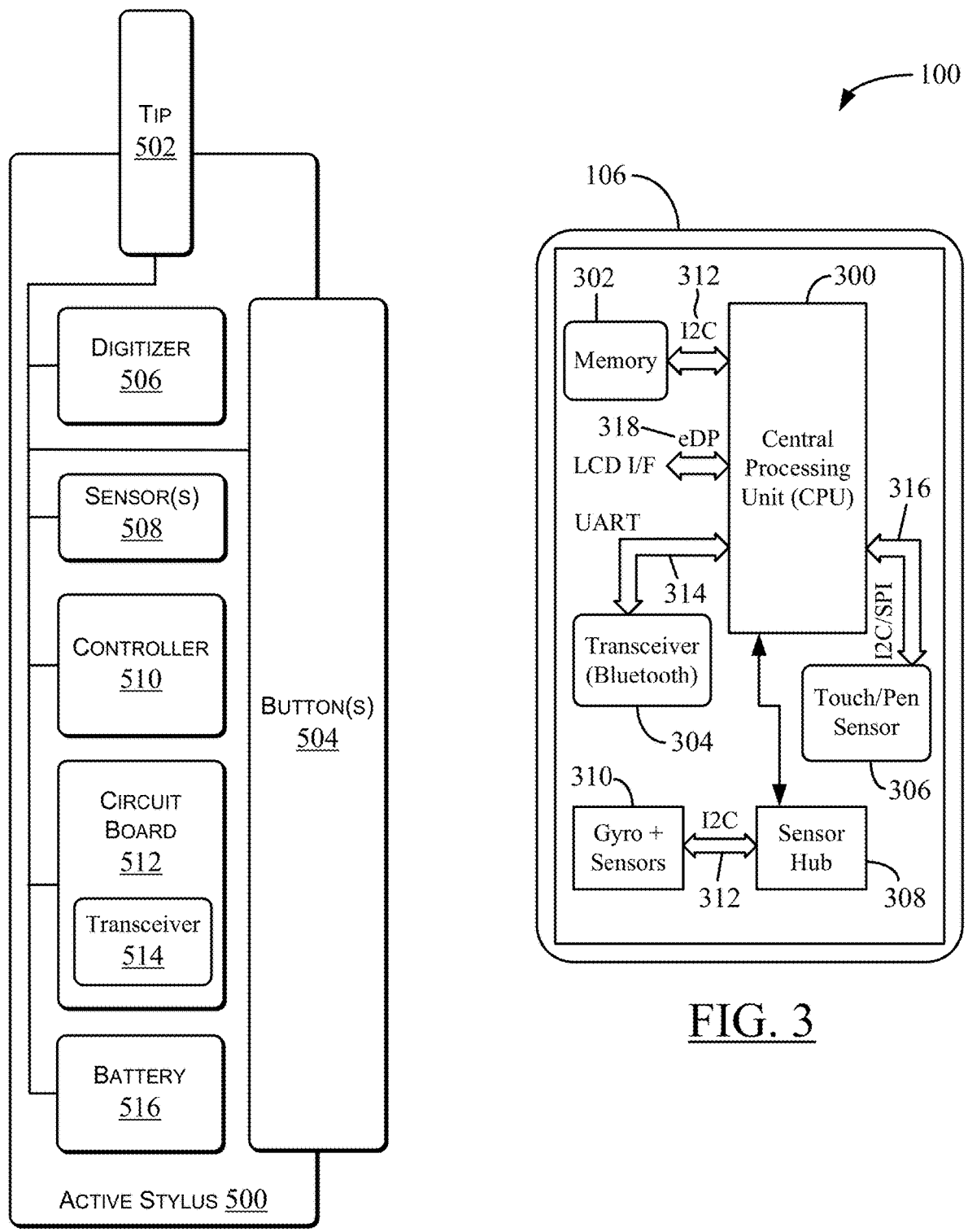
FIG. 3 is an exemplary architectural block diagram of the computing device in FIG. 1 according to particular embodiments of the present disclosure.

FIG. 3 is an exemplary architectural block diagram of the computing device 100 in FIG. 1 according to particular embodiments of the present disclosure. The housing 106 of the computing device 100 may include at least one Central Processing Unit (CPU) 300 operatively coupled to a memory unit 302, a transceiver unit 304, a touch-screen/pen sensor unit (more simply, "screen sensor") 306, and a sensor hub 308. The housing 106 also may include a sensor block 310, which may contain a number of sensors placed throughout different locations within the computing device 100. The sensed signals or data from the sensors may be received/collected by the sensor hub 308 and shared with the CPU 300 for further processing. Some exemplary sensors include proximity detection sensors that detect proximity of a human hand/body or a non-human object (such as metallic material) to the computing device 100, device orientation and rotation detection sensors including one or more accelerometers and/or gyroscopes (such as, for example, a 9-axis accelerometer, a gyroscope, and/or an E-compass or digital compass that provides orientation in relation to earth's magnetic field so that the displayed content is aligned with the user's orientation regardless of the orientation of the display screen), electrical noise detection sensors, a barometer, a magnetometer, a light sensor, an imaging sensor (e.g., a camera), a fingerprint sensor, a global positioning satellite (GPS) sensor, and the like. In one embodiment, the sensor block 310 may include all or any combination of these (or other) sensors. The sensor block 310 may communicate with the sensor hub 308 via an Inter-Integrated Circuit (I2C) bus 312. In some embodiments, the sensor hub 308 may be a component of a Peripheral Controller Hub (PCH) (not shown), such as an Integrated Sensor Hub (ISH) implemented as a driver in an Operating System (OS) of the computing device 100. In one embodiment, the CPU 300 may provide the ISH functionality and the sensor hub 308 may be implemented as part of the CPU 300.

In one embodiment, the memory unit 302 may interface with the CPU 300 via the I2C bus 312, as shown. In one embodiment, the memory unit 302 may contain one or more Electrically Erasable Programmable Read-Only Memory (EEPROM) memory chips. In another embodiment, the memory 302 may include computer-readable media such as, for example, a USB memory. The memory 302 may be used to store software instructions, such as an operating system (OS) and one or more applications. The software instructions may be executed by the CPU 300. The operating system may include a local authentication module to authenticate users of the computing device 100, for example, by requesting and authenticating, one or more of a username, a password, a passcode, biometric input (e.g., fingerprint scan, retinal scan, or the like), or another type of authentication data. The operating system also may store pairing data identifying other devices (e.g., the stylus 102) with which the computing device 100 is currently paired. The applications may include applications capable of receiving input via one or more input devices, such as the stylus 102, an on-screen or external keyboard, a trackpad, a numeric keypad, another type of input device, or any combination thereof. The input may include input received via a user manipulating an active stylus (e.g., the stylus 102), such as letters, words, sentences, paragraphs and the like written in a cursive or printed script, drawings or other graphical input, and other types of input. The memory unit 302 may include software that enables a user to use the computing device 100 with an active stylus in a manner similar to a pad of paper (or paper-based notebook) and ink-based pen (or graphite-based pencil). For example, the user may power-on (or wake from a low power consumption state, such as hibernation) the computing device 100 and provide stylus input (e.g., enter notes) using an application being executed by the computing device 100.

In one embodiment, the transceiver unit 304 may communicate with the CPU 300 via a Universal Asynchronous Receiver/Transmitter (UART) interface 314. The transceiver unit 304 may include Radio Frequency (RF) transmission/reception circuits to enable the computing device 100 to communicate with the active stylus 102 using a wireless technology, such as Bluetooth®, ZigBee®, wireless universal serial bus (USB), or other Near Field Communication (NFC) technology that provides wireless communications over a short distance. The transceiver unit 304 may wirelessly transmit UL signals (as instructed by the screen sensor 306) and wirelessly receive DL signals from the active pen 102 under operative control of the CPU 300. Various UL and DL signals and their timings as per teachings of the present disclosure are discussed later with reference to FIG. 12. In certain embodiments, the transceiver unit 304 also may provide support for communication using different wireless technologies/protocols. For example, the computing device 100 may communicate with an external storage (such as, for example, a cloud storage) or a remote server using a wireless technology, such as WiFi®, code division multiple access (CDMA), global system for mobile communication (GSM), or other technique that provides wireless communication over a medium or a long distance.

In one embodiment, the screen sensor 306 may communicate with the CPU 300 via an input/output (I/O) interface 316, which may be an I2C bus like the I2C bus 312 or a Serial Peripheral Interface (SPI). The screen sensor 306 may operate to detect user inputs—through human touch or via the active pen 102—provided to the touchscreen 104. To enable an interference-free operation of the active pen 102 on the display screen 104, the screen sensor 306 may perform necessary UL signaling and receive DL signals from the active pen 102 through the transceiver 304, under operative control of the CPU 300, as per teachings of the present disclosure. Such UL and DL signaling is discussed in detail later with reference to FIG. 12. In some embodiments, the screen sensor 306 may be implemented as part of the CPU 300, in which case, various screen sensor-related operations discussed later may be considered to be performed by the CPU 300 alone.

Furthermore, although not shown in FIG. 3, other components not mentioned above, but relevant for the operation of the device 100, may be located in the housing 106. For example, for graphics processing, a graphics process unit (GPU) and supporting hardware (e.g., graphics support chips, graphics memory, and the like) may be housed in the housing 106. The GPU may be integrated into the CPU 300 or may be a separate device from the CPU. The integrated case is illustrated in FIG. 3, where the GPU/CPU 300 may provide two or more lanes of an embedded Display Port (eDP) output 318 that are sent to the display screen 104 via a Liquid Crystal Display interface (LCD I/F). In another embodiment, instead of the eDP output 318, the GPU-integrated CPU 300 may provide two or more lanes of a Display Port (DP) output (not shown) that are sent to the display screen 104. In some cases, the computing device 100 may include one or more dedicated digital signal processing (DSP) processors to perform audio (and video) signal processing. The CPU and GPU may be connected to one or more input-output (I/O) ports via an I/O bus. The I/O ports may include video ports (e.g., a video graphics adapter (VGA) port, a digital video interface (DVI) port, a high definition media interface (HDMI) port, a ThunderBolt® port, or the like), audio ports (e.g., microphone jack, headphone, jack, and the like), data ports (e.g., USB ports compliant with USB 2.0, USB 3.0, and the like), communication ports (e.g., Ethernet and the like), another type of port, or any combination thereof. As a further example, the device 100 may include a battery having multiple power cells. If the device 100 is configured to support cellular communication, a Subscriber Identity Module (SIM) slot may be provided in the housing 106 to receive a SIM card from a cellular service provider. It is noted here that although not shown in FIG. 3, the display screen 104 may be located within the housing 106 and the components illustrated in FIG. 3 may be placed inside the housing 106 located behind the display screen 104.

Figure 4:
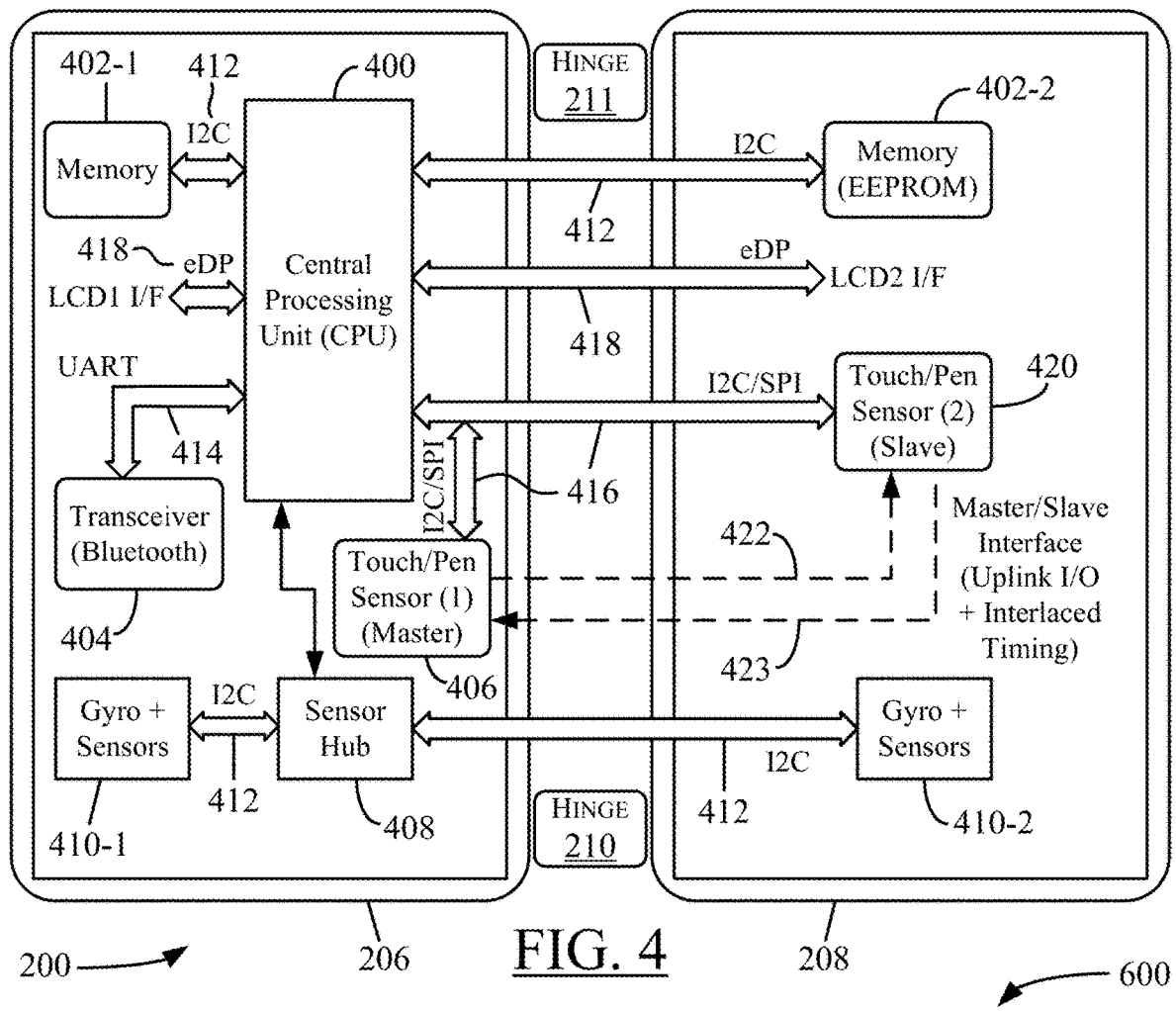
FIG. 4 is an exemplary architectural block diagram of the computing device in FIG. 2 according to certain embodiments of the present disclosure.

FIG. 4 is an exemplary architectural block diagram of the computing device 200 in FIG. 2 according to certain embodiments of the present disclosure. The configuration shown in FIG. 4 is substantially similar to that shown in FIG. 3, except for a distributed placement of various functionally-similar components inside the housings 206, 208. Therefore, components in FIG. 4 having functional similarity with respective components in the configuration of FIG. 3 will be only briefly discussed here for the sake of brevity. Furthermore, it is noted that essentially the entire discussion of the configuration in FIG. 3 remains applicable to the configuration in FIG. 4, except for the master-slave configuration of screen sensors (discussed later below) and availability of simultaneous operation of two active pens—one on each of the two touchscreens 212, 214. These additional aspects are briefly mentioned below and discussed in more detail later with reference to FIGS. 14-15.

A first portion of the components of the computing device 200 may be located in the first housing 206 (e.g., behind the first display screen 212) while a remaining portion of the components of the computing device 200 may be located in the second housing 208 (e.g., behind the second display screen 214). For example, as illustrated in FIG. 4, the components located in the first housing 206 may include at least one CPU 400 operatively coupled to a first memory unit 402-1, a transceiver unit 404, a first touch-screen/pen sensor unit (more simply, "first screen sensor") 406, and a sensor hub 408. The first housing 206 also may include a first sensor block 410-1, which may contain a number of sensors placed throughout different locations within the first housing 206. The sensed signals or data from the sensors in the first sensor block 410-1 may be received/collected by the sensor hub 408 and shared with the CPU 400 for further processing. As in case of the CPU 300 in FIG. 3, in one embodiment, the CPU 400 also may provide the ISH functionality and the sensor hub 408 may be implemented as part of the CPU 400. The I2C bus, I/O interface (I2C/SPI interface), and the UART interface within the housings 206, 208 are identified using reference numerals "412," "414," and "416", respectively. As in case of the CPU 300 in FIG. 3, the CPU 400 in FIG. 4 also may integrate GPU functionality and may provide two or more lanes of an eDP output 418 that are sent to the first display screen 212 via LCD-1 I/F within the first housing 206, as shown.

The second housing 208 may include the remaining portion of the components of the computing device 200. Thus, as illustrated in FIG. 4, the components located in the second housing 208 may include a second memory unit 402-2 operatively coupled to the CPU 400, a second touch-screen/pen sensor unit (more simply, "second screen sensor") 420 operatively coupled to the CPU 400, and a second sensor block 410-2 (in communication with the sensor hub 408), which may contain a number of sensors placed throughout different locations within the second housing 208. The sensed signals or data from the sensors in the second sensor block 410-2 may be received/collected by the sensor hub 408 and shared with the CPU 400 for further processing. The two or more lanes of the eDP output 418 from the CPU 400 may be sent to the second display screen 214 via LCD-2 I/F within the second housing 208, as shown.

Some exemplary sensors are mentioned before with reference to discussion of the sensor block 310 in FIG. 3. Similar sensors may comprise one or more of the sensor blocks 410-1 and 410-2. In some embodiments, both the sensor blocks 410-1 and 410-2 may have the same set of sensors. In other embodiments, different types of sensors may be present in each of the sensor blocks 410-1 and 410-2. In one embodiment, either or both of the sensor blocks 410-1 and 410-2 may include device hinge angle detection sensors because the computing device 200 may be formed of two or more parts hinged together using hinges, such as the hinges 210-211. In one embodiment, the hinge angle detector may be an optical sensor such as, for example, a fiber optic cable to sense the hinge angle through reflection of light or an optical encoder placed in a hinge to count a hinge's opening/closing movement via reflections of light from black-and-white strips placed nearby. In some embodiments, data from the hinge angle detection sensor(s) and/or data from other sensors (such as, for example, an accelerometer, a gyroscope, and the like) may enable the CPU 400 to determine the device orientation or orientation.

For ease of discussion, the components 402-1 and 402-2 may be collectively referred to using the reference numeral "402", and the components 410-1 and 410-2 may be collectively referred to using the reference numeral "410." As noted above, because of substantial functional similarity between the entities 302, 304, 308, 310, 312, 314, 316, 318 in FIG. 3 and corresponding entities 402, 404, 408, 410, 412, 414, 416, 418 in FIG. 4, the earlier discussion of the common entities in FIG. 3 is not repeated here in the context of FIG. 4 for the sake of brevity. It is, however, understood that functional similarity does not necessarily mean that these entities are identical; they may have certain differences and operational variations based on the implementation—in a single-screen device in FIG. 3 versus a dual-screen device in FIG. 4. Such variations may be pointed out in the discussion below when applicable.

In some embodiments, one or both of the screen sensors 406, 420 may be implemented as part of the CPU 400, in which case, various screen sensor-related operations discussed later may be considered to be performed by the CPU 400 alone. In other embodiments, when the separate screen sensors 406, 420 are present, they may perform screen sensor-related operations under operative control of the CPU 400. For example, the first screen sensor 406 may perform necessary UL signaling and receive DL signals from the first active pen 202 through the transceiver 404, under operative control of the CPU 400, as per teachings of the present disclosure. Similarly, the second screen sensor 420 may perform necessary UL signaling and receive DL signals from the second active pen 204 through the transceiver 404, under operative control of the CPU 400, as per teachings of the present disclosure. Such UL and DL signaling is discussed in detail later with reference to FIGS. 12 and 15. In particular embodiments, the first screen sensor 406 may operate as a "master" and the second screen sensor 420 may operate as a "slave" to accomplish the desired uplink and downlink timings—the uplink I/O timings in FIG. 12 and the inter-laced timings in FIG. 15—as per teachings of the present disclosure. This master-slave interface is illustrated using arrows 422-423 in FIG. 4 and operational details of this master-slave configuration are provided later. It is understood that, in certain embodiments, the second screen sensor 420 may operate as a "master" and the first screen sensor 406 may operate as a "slave." The discussion below equally applies to such an arrangement as well.

It is understood that only the components and interfaces relevant to the present disclosure are shown in FIG. 4. In practice, either or both of the housings 206, 208 may include additional or different components depending on the implementation. Such components may include, for example, keyboard, touchpad, trackball, speaker, microphone, antennas (Wi-Fi antenna, Bluetooth® antenna, Zigbee® antenna, cellular antenna, and the like), one or more SIM slots, separate GPU and supporting hardware, one or more dedicated DSP processors, DP output lanes, I/O ports, a power input (e.g., alternating current (AC) or direct current (DC) input), a charger, and a battery. The battery charger may be used as a power source to provide power instead of (or in addition to) the battery when the battery is depleted or inoperable. The battery may include multiple power cells, with a portion of the power cells located in the first housing 206 and zero or more of the power cells located in the second housing 208. In certain embodiments, the eDP output 418 may be sent to the first display screen 212 in the first housing 206 as shown in FIG. 4, and two or more lanes of a DP output (not shown in FIG. 4) may be sent (e.g., wirelessly or via a cable) to the second display screen 214 in the second housing 208. In some cases, data cables may run through the hinges 210-211 to connect the components of the computing device 200 located in the first housing 206 with the components of the computing device 200 located in the second housing 208. In other cases, the transceiver 404 may provide wireless communications between the components located in the first housing 206 and the components located in the second housing 208.

In FIG. 4, one set of components of the computing device 200 shown as being located in the first housing 206 and the remaining set of components shown as located in the second housing 208 are purely for illustration purpose. Depending on the implementation, different components of the computing device 200 may be housed in one or both of the housings 206, 208. For example, when the computing device 200 is designed for graphics processing, a GPU and supporting hardware (e.g., graphics support chips, graphics memory, and the like) may be housed in the second housing 208. As another example, in some cases, the I/O ports may be located in the first housing 206, or in the second housing 208, or split between the two housings 206, 208. Similarly, the hardware constituting the transceiver unit 404, the sensor hub 408, and the like, may be split or replicated between the two housings 206, 208 depending on the design consideration. In some cases, which components of the computing device 200 are located in each of the housings 206, 208 may be determined by the thermal characteristics of the components. For example, the components may be distributed between the housings 206, 208 to enable each of the housings 206, 208 to heat to approximately the same temperature. Doing so may avoid grouping components that generate the most heat into the same housing, thereby causing one housing to be hotter than the other housing.

FIG. 5 is an exemplary architectural block diagram of an active pen (or active stylus) 500 according to some embodiments of the present disclosure. The active pen/stylus 500 is treated as representative of the active pens 102, 202, and 204. Therefore, the discussion of the active pen 500 in FIG. 5 applies to any of the active pens 102, 202, and 204 in FIGS. 1-2. As shown in FIG. 5, the active stylus 500 may include a tip 502, one or more buttons 504, a digitizer 506, one or more sensors 508, a controller 510, a circuit board 512 comprising a transceiver unit 514, and at least one battery 516. All of these components in the active pen 500 may be operatively coupled as shown to support inter-component data communication. The tip 502 may be used by a user to apply pressure to a touch sensitive display (e.g., the display 104 in FIG. 1, or any of the displays 212, 214 in FIG. 2). One of the sensors 508 may be embedded into the tip 502 and may be used to measure different levels of pressure (e.g., 0 to 16, 0 to 256, or other pressure levels). The sensors 508 may include a pressure sensor (to measure an amount of pressure exerted by the tip 502), a location detection sensor (to determine a current location of the tip 502), a motion sensor (to determine a motion of the tip 502), a tilt sensor (e.g., to measure an angle at which the stylus 500 is being held), another type of sensor (such as an optical sensor), or any combination thereof. The sensors 508 may generate sensor data, which may include digital data and analog data. The digitizer 506 may digitally sample analog signals received from one or more of the sensors 508 to create digital signals. The controller 510 may be an embedded controller, a CPU, or another type of logic-execution device that is programmed to perform specific functions, such as receiving and analyzing the sensor data from the sensors 508, receiving button data from one or more of the buttons 504, transmitting the data to and receiving the data from the corresponding computing device (such as the computing device 100 or 200), receiving and acting upon commands (e.g., a pairing command) received from the computing device, and the like. In particular embodiments, one or more of the digitizer 506, the buttons 504, the sensors 508, the controller 510, and the battery 516 may be mounted on the circuit board 512. The battery 516 may provide power (e.g., direct current (DC) voltage) to one or more of the components 502, 504, 506, 508, 510, 512, and 514 of the stylus 500. Although not shown in FIG. 5, in some embodiments, the circuit board 512 may also include a transducer (e.g., speaker, buzzer, or the like), a camera, and one or more lights (e.g., LED or the like).

In one embodiment, the transceiver unit 514 may include RF transmission/reception circuits (and one or more antennas) to enable the active pen 500 to communicate with the corresponding computing device 100 or 200 using a wireless technology, such as Bluetooth®, ZigBee®, wireless universal serial bus (USB), or other Near Field Communication (NFC) technology that provides wireless communications over a short distance. The transceiver unit 514 may wirelessly transmit DL signals and wirelessly receive UL signals from the respective computing device 100 or 200 (more specifically, from the respective screen sensor in the computing device, as discussed later below) under operative control of the controller 510. For example, in one embodiment, the controller 510 may wirelessly transmit a pen ID specific to the active pen 500 through the transceiver 514 to a display screen (such as the display screen 104 in FIG. 1) using a DL signal and wirelessly receive through the transceiver 514 a screen ID specific to the display screen in an UL signal from the display screen to thereby establish a one-to-one pairing between the active pen 500 and the display screen in the manner discussed in more detail later. Various such UL and DL signals and their timings as per teachings of the present disclosure are discussed later with reference to FIGS. 12 and 15.

The user may provide a particular instruction that causes one (or more) of the applications (e.g., a note taking application) to launch (e.g., instantiate) and begin executing on the computing device, such as the device 100 or the device 200. The user may provide the particular instruction using the active stylus 500, e.g., using one or more of the tip 502, the buttons 504, the sensors 508, or any combination thereof. For example, the user may perform X clicks (where X>0) of a particular one of the buttons 504, a particular ordered combination of clicks of the buttons 504, X taps of the tip 502 at a particular location in one of the touchscreen displays 104, 212, or 214, or the like. To illustrate, the user may click a particular one of the buttons 504 twice to launch a particular application, such as a note-taking application (e.g., OneNote®, Bamboo Paper®, or the like). In some cases, the particular instruction may power on the associated computing device 100 or 200 (e.g., from a power off state or a low power consumption state, such as a hibernate state) in addition to causing the computing device 100 or 200 to launch the application (e.g., an application capable of receiving stylus input).

The user may provide an input—like the input 114 in FIG. 1—to one of the applications using the stylus 500. For example, the input may include cursive letters and numbers, printed letters and numbers, drawings, doodles, and other types of input that can be provided using a stylus. In some cases, the computing device 100, 200 may use optical character recognition (OCR) or another technique to convert at least a portion of the input into text input, such as the text input 116 in FIG. 1. The application that receives the user input may store the input locally, e.g., in a memory such as the memory 302 in FIG. 3 or the memory 402 in FIG. 4. The computing device 100, 200 may store information as to which user is associated with which stylus. For example, if a second user uses stylus #XYZ to leave a note, the computing device 100, 200 may have a table identifying the owner of stylus #XYZ.

As mentioned before, in some cases, a first user and a second user may simultaneously provide inputs using respective active pens, such as the pens 202 and 204 in FIG. 2. Such simultaneous operation of two active pens may be provided without interference as per the teachings of the present disclosure given below. In case of a dual-screen computing device, like the device 200, the simultaneous inputs may be provided—one on each display 212, 214—when the computing device 200 is in a specific operating mode, like a tent mode or a double landscape flat mode, as discussed in more detail later with reference to FIG. 14.

Figure 6:
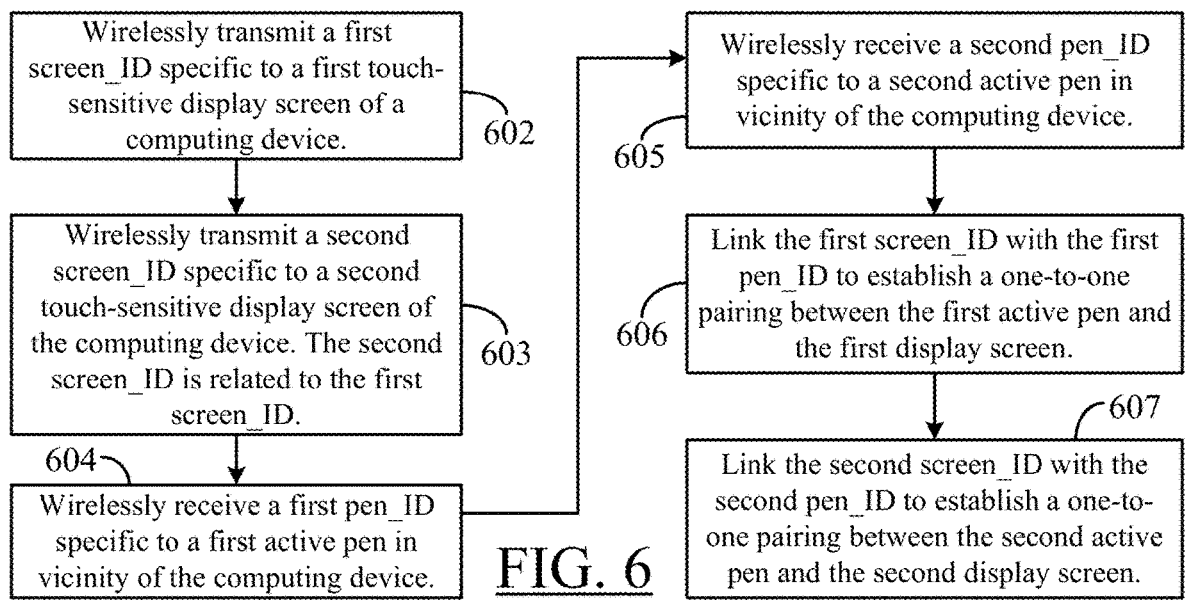
FIG. 6 is an exemplary flowchart of a process to individually pair each screen of a dual-screen computing device with a corresponding active pen to enable simultaneous operation of two active pens on the computing device in an interference-free manner according to particular embodiments of the present disclosure.
Figure 8:
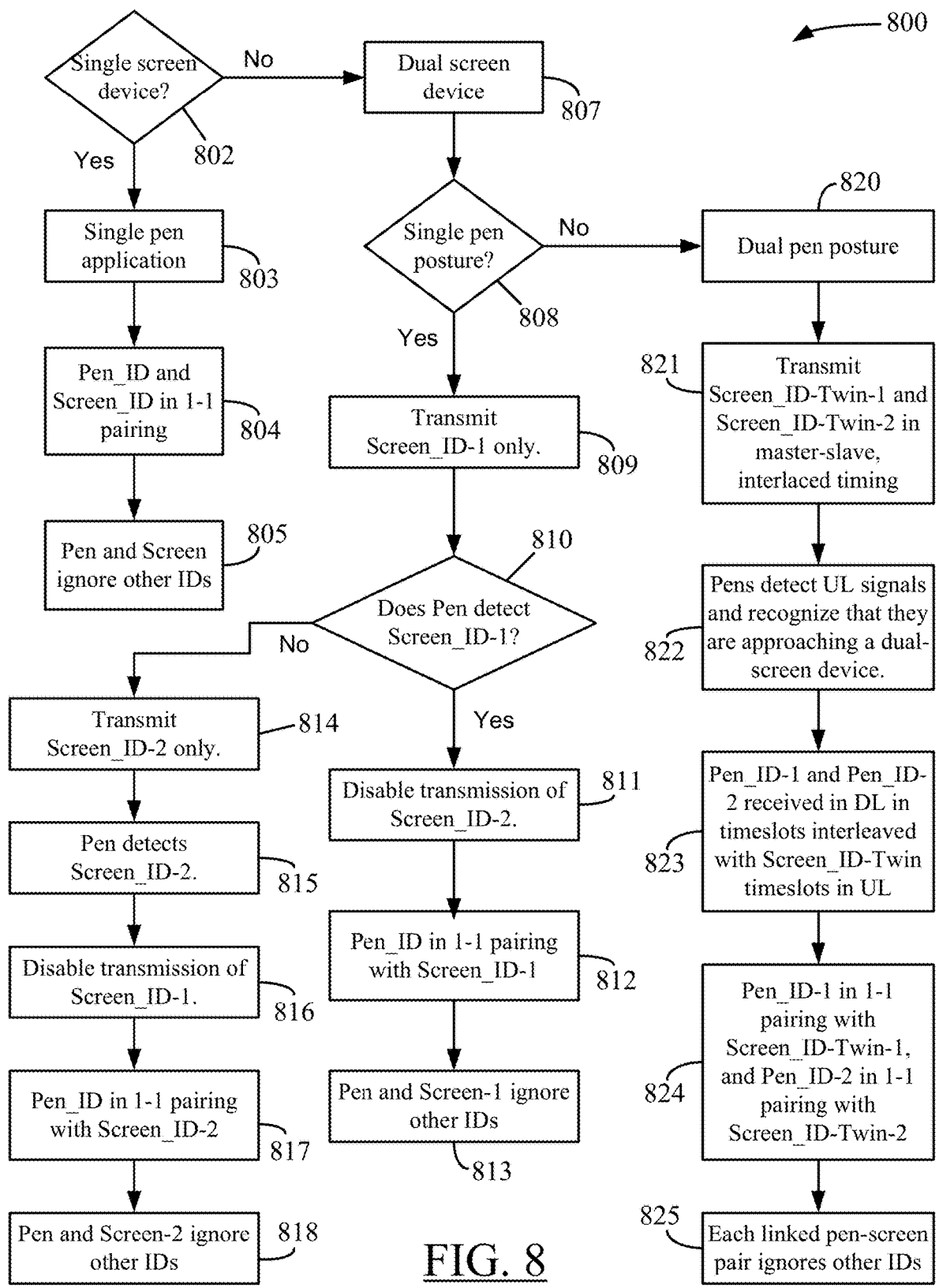
FIG. 8 is an exemplary flowchart showing details of how operations of single and dual active pens may be supported on a computing device in an interference-free manner according to some embodiments of the present disclosure.

Before proceeding further, it is noted here that various operational blocks shown in the flow diagrams of FIGS. 6, and 8 can be implemented in hardware, software, or a combination thereof. In the context of software, the blocks represent computer-executable instructions that, when executed by one or more processors, cause the processors to perform the recited operations/tasks. Generally, computer-executable instructions include routines, programs, objects, modules, components, data structures, and the like that perform particular functions or implement particular abstract data types. The order in which the blocks are described is not intended to be construed as a limitation, and any number of the described operations/tasks can be combined in any order and/or in parallel to implement the processes. For discussion purposes, the processes in FIGS. 6 and 8 are described with reference to the hardware configurations of FIGS. 1-5, although other models, frameworks, systems and environments may be used to implement these processes.

FIG. 6 is an exemplary flowchart 600 of a process to individually pair each screen of a dual-screen computing device—such as the device 200 in FIGS. 2, 4—with a corresponding active pen to enable simultaneous operation of two active pens on the computing device in an interference-free manner according to particular embodiments of the present disclosure. Thus, for example, the process of FIG. 6 may allow simultaneous operation of active pens 202, 204 one on each corresponding screen 212, 214 of the computing device 200. In particular embodiments, the process tasks illustrated in FIG. 6 may be performed by a dual-screen computing device, such as the computing device 200 in FIGS. 2 and 4 having the functionality of the master-slave screen sensors 406, 420 as per teachings of the present disclosure. In some embodiments, the program code contained in the memory 402 may be executed by a processor such as the CPU 400—in the computing device 200 to enable the computing device 200 to perform the tasks illustrated in the flowchart 600 of FIG. 6. In certain embodiments, the executable firmware of the screen sensors 406, 420 may enable each screen sensor 406, 420 to perform screen sensor-specific transmission, reception, and ID-linking tasks shown in the flowchart 600 and discussed in more detail below.

Initially, at block 602, the computing device 200 may wirelessly transmit a first screen ID specific to a first touch-sensitive display screen of the computing device, such as the display screen 212 in FIG. 2. In particular embodiments, the first screen sensor 406 may initiate transmission of an UL signal with the first screen ID via the transceiver 404 and under operative control of the CPU 400. At block 603, the computing device 200 may wirelessly transmit a second screen ID specific to a second touch-sensitive display screen of the computing device, such as the display screen 214 in FIG. 2. In particular embodiments, the second screen sensor 420 may initiate transmission of an UL signal with the second screen ID via the transceiver 404 and under operative control of the CPU 400. As noted at block 603 and discussed in more detail later, the second screen ID may be related to or derived from the first screen ID, thereby enabling a corresponding pen to discriminate another screen ID emitted by a different device in the proximity. In particular embodiments, the first screen ID may be the screen ID-twin-1 and the second screen ID may be the screen ID-twin-2 discussed later with reference to FIGS. 14-15. At block 604, the computing device 200 may wirelessly receive a first pen ID specific to a first active pen—such as the active pen 202—in the vicinity of the computing device. In particular embodiments, the first screen sensor 406 may receive a DL signal with the first pen ID via the transceiver 404 and under operative control of the CPU 400. At block 604, the computing device 200 may wirelessly receive a first pen ID specific to a first active pen—such as the active pen 202—in the vicinity of the computing device. In particular embodiments, based on the strength of a DL signal (containing the first pen ID) received from the active pen 202 and the detected proximity of the pen 202 and the first display screen 212, the first screen sensor 406 may receive the DL signal (with the first pen ID) via the transceiver 404 and under operative control of the CPU 400. At block 605, the computing device 200 may wirelessly receive a second pen ID specific to a second active pen—such as the active pen 204—in the vicinity of the computing device. In particular embodiments, based on the strength of a DL signal (containing the second pen ID) received from the active pen 204 and the detected proximity of the pen 204 and the second display screen 214, the second screen sensor 420 may receive the DL signal (with the second pen ID) via the transceiver 404 and under operative control of the CPU 400. As mentioned before, various wireless transmissions and receptions noted at blocks 602-605 may be carried out by the computing device 200 (more specifically, by the transceiver 404 in the computing device 200) using a wireless technology, such as Bluetooth®, ZigBee®, NFC, and so on. At block 606, the computing device 200 may link the first screen ID with the first pen ID to establish a one-to-one pairing between the first active pen 202 and the first display screen 212. More specifically, in certain embodiments, such linking may be performed by the first screen sensor 406 under operative control of the CPU 400. Similarly, at block 607, the computing device 200 may link the second screen ID with the second pen ID to establish a one-to-one pairing between the second active pen 204 and the second display screen 214. In certain embodiments, the linking at block 607 may be performed by the second screen sensor 420 under operative control of the CPU 400. The linking of pen-specific and screen-specific identifiers (IDs) created as per teachings of the present disclosure to extend the existing active pen protocols thus allow for simultaneous operations of two active pens on a dual-screen device in an interference-free manner, as discussed later in more detail.

FIGS. 7A-7L illustrate exemplary orientations of a dual-screen computing device in different exemplary operating modes that may be taken into account for single-pen versus dual-pen uplink activation decision according to certain embodiments of the present disclosure. For ease of discussion, the term "FIG. 7" may be used to collectively refer to all of the drawings in FIGS. 7A-7L. The illustrations in FIG. 7 relate to the dual-screen device 200 shown in FIGS. 2 and 4. As discussed later, in particular embodiments, the screen sensors 406, 420 may follow the UL and DL timing arrangement of FIG. 12 when the computing device 200 is in one of a first set of operating modes, and the timing arrangement of FIG. 15 when the device 200 in one of a second set of operating modes. It is noted here that the illustrations in FIG. 7 are exemplary only; they do not show all possible orientations/orientations or possible operating modes of the dual-screen device 200. For clarity of drawings and to avoid clutter, all of the drawings in FIG. 7 identify each display screen of the device 200 using only the big-size, bold number "1" or "2" as shown in FIG. 2, and not using the corresponding reference numeral "212" or "214".

The device orientations in FIG. 7 are identified using the device orientation in FIG. 2 as a "reference". In other words, when the device 200 is placed on a surface with both display screens 212, 214 opened as shown in FIG. 2, the display screen "1" (with reference numeral "212") will be on the left side and the display screen "2" (with reference numeral "214") will be on the right side of the hinges 210, 211. Furthermore, in some drawings in FIG. 7, one or both of the screen numbers "1" and "2" (written in bold and large size) may be upside down to indicate physical rotation of the screen from its "reference" orientation, but the displayed content may be appropriately rotated so that the user can comprehend it. This is similar to current smartphones or tablets where a physical rotation of the device screen rotates the displayed content as well.

The operating mode related to the exemplary orientations of the computing device 200 in FIGS. 7A-7B may be referred to as the "book mode" where the angle between the housings 206, 208 may be approximately between 0 and 180 degrees (e.g., 150 degrees, 120 degrees, 90 degrees, 60 degrees, 30 degrees, or the like) and one or both of the display screens 212, 214 may get rotated from their "reference" orientation in FIG. 2. The "laptop mode" in FIGS. 7C-7D may be similar to the "book mode", except for the more horizontal placement of one of the display screens as opposed to the vertical placement of the screens in the "book mode" of FIGS. 7A-7B. In the orientations shown in FIGS. 7A-7D, both of the displays 212, 214 may be facing the user. However, in the exemplary operating mode referred to as the "closed orientation" mode in FIGS. 7E-7F, one of the display screens 212 or 214 may be facing the user as shown. In the closed orientation, the angle between the housings 206, 208 may be approximately 0 degree (or 360 degrees) and, hence, the closed orientation mode also may be referred to as the "360° flip mode". The device orientations in FIGS. 7G-7H relate to the exemplary "tent mode" where the angle between the housings 206, 208 may be approximately between 0 and 180 degrees (e.g., 150 degrees, 120 degrees, 90 degrees, 60 degrees, 30 degrees, or the like). In the tent mode, one display screen may be facing the user whereas the other display screen may be facing away from the user, as shown. In that case, the display screen facing away from the user may be available to another user when, for example, two users wish to simultaneously write on the respective display screens using individual active pens (like the pens 202, 204). Like the "closed orientation" mode in FIGS. 7E-7F, the "tablet orientation" mode in FIGS. 7I-7J also may have one of the display screens 212, 214 facing the user as shown and the angle between the housings 206, 208 also may be approximately 0 degree. In the tablet orientations in FIGS. 7I-7J, one display screen may be facing the user whereas the other display screen may be facing away from the user. The "flat orientation" mode in FIGS. 7K-7L may be considered similar to the orientations shown in FIGS. 2 and 4. In the flat orientations of FIGS. 7K-7L, the angle between the housings 206, 208 may be approximately 180 degrees. In the double portrait flat mode of FIG. 7K, the longer side of each of the two screens 212, 214 runs from top to bottom (like in a "portrait" orientation), whereas in the double landscape landscape flat mode of FIG. 7L, the shorter side of each of the two screens 212, 214 runs from top to bottom (like in a "landscape" orientation).

FIG. 8 is an exemplary flowchart 800 showing details of how operations of single and dual active pens may be supported on a computing device in an interference-free manner according to some embodiments of the present disclosure. As discussed below, the computing device may be a single-screen device, like the device 100 in FIGS. 1 and 3, or a dual-screen device, like the device 200 in FIGS. 2 and 4. A single-screen device may have a single active pen (like the pen 102 in FIG. 1) enabled to work with it, whereas a dual-screen device may have a single active pen (for example, any one of the pens 202, 204 in FIG. 2) or two active pens (for example, both of the pens 202 and 204 in FIG. 2) enabled to work with it depending on the operating mode (or device orientation/orientation) of the device, as discussed later. It is noted that the discussion related to the dual-screen device may be extended to apply to a multi-screen device (not shown) having three or more touchscreens. In case of a multi-screen device, the dual active pen related discussion below may be extended to support simultaneous operation of three or more active pens—one on each screen—in an interference-free manner.

In particular embodiments, various single-screen device related tasks illustrated in FIG. 8 may be performed by a computing device, such as the computing device 100, having the screen sensor 306 as per teachings of the present disclosure. In some embodiments, the program code contained in the memory 302 may be executed by a processor—such as the CPU 300—in the computing device 100 to enable the computing device 100 to perform relevant tasks illustrated in the flowchart 800 of FIG. 8. In certain embodiments, the executable firmware of the screen sensor 306 may enable the screen sensor 306 to perform the relevant tasks shown in the flowchart 800 and discussed in more detail below. On the other hand, various dual-screen device related tasks illustrated in FIG. 8 may be performed by a computing device, such as the computing device 200, having the functionality of the master-slave screen sensors 406, 420 as per teachings of the present disclosure. In some embodiments, the program code contained in the memory 402 may be executed by a processor—such as the CPU 400—in the computing device 200 to enable the computing device 200 to perform relevant tasks illustrated in the flowchart 800 of FIG. 8. In certain embodiments, the executable firmware of the screen sensors 406, 420 may enable each screen sensor 406, 420 to perform screen sensor-specific transmission, reception, and ID-pairing tasks shown in the flowchart 800 and discussed in more detail below.

Initially, at decision block 802, it may be determined whether the computing device is a single-screen device or a dual-screen device. In case of a single-screen device (like the device 100 in FIGS. 1 and 3), the single pen application (block 803) as per the present disclosure may apply, in which case one-to-one pairing between the pen ID of the active pen (such as the pen 102 in FIG. 1) and the screen ID of the single screen (such as the screen 104 in FIG. 1) may be established (block 804) as discussed later with reference to FIG. 10 and the timing diagram of FIG. 12. Once the 1-1 pairing is established, the active pen and its paired screen may ignore IDs received from other screens or pens operating in the vicinity, as noted at block 805 and discussed in more detail later.

Figure 11:
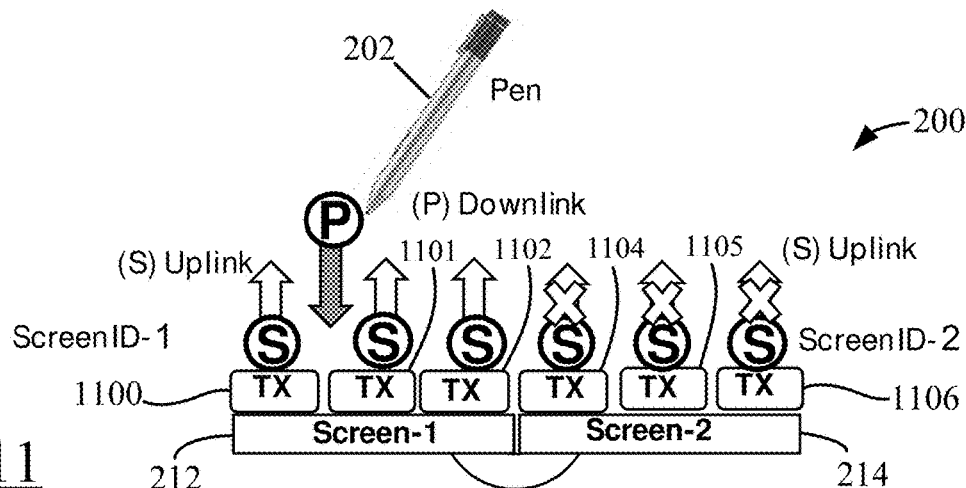
FIG. 11 shows 1-1 pairing between one of the screens of the dual-screen computing device and corresponding active pen of FIG. 2 as per particular embodiments of the present disclosure to enable a screen-pen pair to operate free of interference from the other screen of the device.

The block 807 relates to the case where the computing device is a dual-screen device, such as the device 200 in FIGS. 2 and 4. In particular embodiments of the present disclosure, the device orientation/orientation may determine whether a single active pen may be enabled to write on one of the two screens of the device or two active pens may be enabled to simultaneously write on the device—one on each screen. FIGS. 11 and 13 (discussed later) provide examples of operating modes of a dual-screen device that support the single pen activation. On the other hand, FIG. 14 (discussed later) shows examples of operating modes of a dual-screen device that support the dual-pen activation. As mentioned before, data from various sensors in the sensor blocks 410-1 and 410-2 may be analyzed by the CPU 400 to determine the current orientation or orientation of the dual-screen device 200. Thus, at block 808, when the device orientation is determined to be appropriate for the single pen application, the computing device 200 (more specifically, the first screen sensor 406 in particular embodiments) may initially transmit the screen ID-1 (associated with the first display screen 212) at block 809 in an UL signal and wait for the response from the active pen (such as the active pen 202 in FIG. 2) in the vicinity. If a DL signal from the pen 202 indicates that the pen 202 has detected screen ID-1, the first screen sensor 406 may trigger the second screen sensor 420 to disable its transmissions of screen ID-2 (associated with the second display screen 214), as noted at blocks 810-811. The first screen sensor 406 also may establish a 1-1 pairing between the screen ID-1 and the pen ID (of the pen 202) received in the DL signal from the pen 202 (block 812). As long as this 1-1 pairing remains established, the pen 202 and the first screen 212 (more specifically, the first screen sensor 406 managing the UL transmissions for the first screen 212) may ignore other screen IDs or pen IDs (block 813), thereby facilitating an interference-free operation for the active pen 202.

On the other hand, if the active pen 202 is not located near (e.g., within a predetermined distance from) the first screen 212, but, instead, the active pen 204 is located near the second screen 214, then the decision at block 810 may be negative. In other words, the pen 204 may not detect screen ID-1 from the first screen 212 transmitted at block 809. In that case, after a pre-determined time has elapsed after the transmission of the UL signal with the screen ID-1, the computing device 200 (more specifically, the second screen sensor 420 in particular embodiments) may transmit the screen ID-2 (associated with the second display screen 214) at block 814 in another UL signal and wait for the response from the active pen 204. Because of the pen's 204 vicinity to the second screen 214, a DL signal from the pen 204 may indicate that the pen 204 has detected screen ID-2 (block 815). Consequently, the second screen sensor 420 may trigger the first screen sensor 406 to disable its transmissions of screen ID-1, as noted at block 816. The second screen sensor 406 also may establish 1-1 pairing between the screen ID-2 and the pen ID (of the pen 204) received in the DL signal from the pen 204 (block 817). As long as this 1-1 pairing remains established, the pen 204 and the second screen 214 (more specifically, the second screen sensor 420 managing the UL transmissions for the second screen 214) may ignore other screen or pen IDs (block 818), thereby establishing an interference-free operation for the active pen 204. Additional details related to the blocks 809-818 are discussed later with reference to FIGS. 11-13.

At block 820, the device orientation may be determined to be appropriate for the dual pen application (for example, the device orientations shown in FIG. 14). In that case, the computing device 200 (more specifically, the first screen sensor 406 and the second screen sensor 420) may transmit two screen IDs in a master-slave, interlaced timing (shown in FIG. 15) as noted at block 821. In certain embodiments, the two screen IDs may be related to (or derived from) each other and may include: (i) a screen ID-twin-1 (associated with the first display screen 212), and (ii) a screen ID-twin-2 (associated with the second display screen 214). For example, if these IDs are fully-numeric IDs, they may be completely identical, except for the last digit. Alternatively, there may be a pre-defined number of digits common between them. Furthermore, each of these IDs may start with a pre-defined sequence of digits, which may indicate to a pen (which may have been configured to receive and process such IDs) that it is approaching a dual-screen device and will receive the twin-IDs in sequence, as discussed later with reference to FIG. 15. In one embodiment, both of these IDs may be generated by the master screen sensor 406 based on, for example, a pre-defined mathematical formula, algorithm, or method. In particular embodiments, the active pens 202, 204 may be configured to use the same algorithm or methodology to detect and identify these twin-IDs. These twin-screen IDs may be sent by respective screen sensors 406, 420 in corresponding interlaced UL signals, as discussed later with reference to FIG. 15. As noted at block 822, in particular embodiments, the active pens 202, 204 may detect these UL signals and recognize that they are approaching a dual-screen device. In response, each controller (such as the controller 510 in FIG. 5) in the respective pen 202, 204 may prepare and send the pen-specific DL signals in a manner that complies with the interleaved timing shown in FIG. 15 (discussed later).

Thus, as noted at block 823, the computing device 200 (more specifically, the first screen sensor 406 and the second screen sensor 420, as appropriate) may receive the pen ID-1 (of the active pen 202) and the pen ID-2 (of the active pen 204) in the pen-specific DL signals. As also noted at block 823, these pen IDs may be received in the timeslots interleaved with the screen ID-twin (screen ID-twin-1 and screen ID-twin-2) timeslots in the UL (as discussed later with reference to FIG. 15). In particular embodiments, based on the strength of the DL signal (containing the pen ID-1) received from the active pen 202 and the detected proximity of the pen 202 and the first display screen 212, the first screen sensor 406 may establish a 1-1 pairing between the screen ID-twin-1 and the pen ID-1 (of the pen 202) received in the DL signal from the pen 202 (block 824). Similarly, in certain embodiments, based on the strength of the DL signal (containing the pen ID-2) received from the active pen 204 and the detected proximity of the pen 204 and the second display screen 214, the second screen sensor 420 may establish a 1-1 pairing between the screen ID-twin-2 and the pen ID-2 (of the pen 204) received in the DL signal from the pen 204 (block 824). As long as this 1-1 pairing remains established, each linked pen-screen pair (more specifically, the first and the second screen sensors 406, 420 managing the UL transmissions for the respective screens 212, 214)

may ignore other screen IDs or pen IDs (block 825), thereby facilitating simultaneous operation of two active pens 202, 204 on the computing device 200 in an interference-free manner.

Figure 9A:
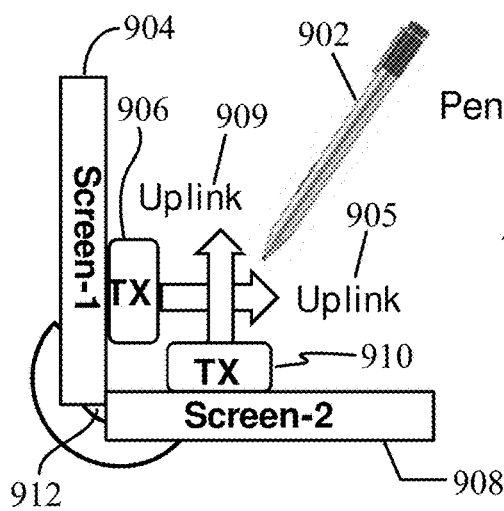
FIGS. 9A-9B show two examples of the UL interference issue when a dual-screen device and an active pen are operating under the existing active pen protocols.
Figure 9B:
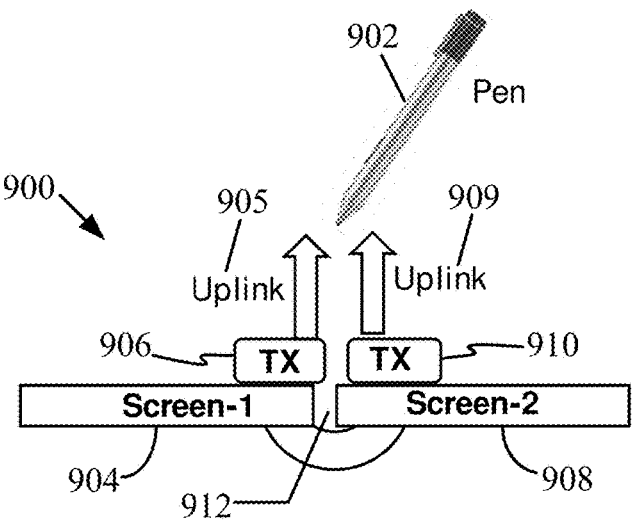

FIGS. 9A-9B show two examples of the UL interference issue when a dual-screen device 900 and an active pen 902 are operating under the existing active pen protocols. In the context of the discussion of FIGS. 9A-9B (collectively "FIG. 9"), it is observed that the device 900 and the pen 902 are different from the devices 100, 200 and pens 102, 202, 204 in that the device 900 and the pen 902 may not be configured to support the protocol extensions as per teachings of the present disclosure—such as, for example, the 1-1 pairing of screen ID and pen ID and the master/slave interlaced timing of UL-DL signals, as discussed later with reference to FIGS. 10-15—to mitigate the interference issues caused by the addition of the uplink interface to the existing active pen protocols (as mentioned earlier). It is further observed that the discussion of FIG. 9 also applies to a single-screen device (not shown), which, like the device 900, is similarly ill-equipped to manage the interference as per teachings of the present disclosure.

As mentioned before, the addition of the UL interface to the existing active pen protocols has created multiple interference issues for single-screen and dual-screen devices. This issue causes the pen and its controller in the device (for example, a touchscreen sensor) to get confused and compromise the inking experience. For example, when inking near the center gap (or near a hinge), the inking becomes inconsistent because of the interference caused by UL signals from the other screen (that is, the screen on which the pen is not writing) in the vicinity of the center gap. This situation is illustrated in the two exemplary device orientations shown in FIGS. 9A-9B—the laptop mode of FIG. 9A and the double portrait flat mode of FIG. 9B. For the sake of illustration, in the configurations of FIGS. 9A-9B, the first screen 904 is shown to be transmitting its screen-specific UL signal 905 during a transmission (TX) time slot 906 and the second screen 908 is shown to be transmitting its screen-specific UL signal 909 during a TX time slot 910. It is understood that the UL signals 905, 909 and the TX blocks 906, 910 are for illustration purpose only; other timing and signaling configurations causing interference may be contemplated. Because these two uplinks 905, 909 may be out-of-phase with each other, they may cause RF interference, especially when the pen 902 is attempting to ink near the hinges (or center gap) 912 as shown in FIG. 9. The pen 902 may be initially synced to the first screen 904, but may get "confused" when it starts receiving the UL signals 909 from the second screen 908. In that case, the pen may enter an "unknown" state and may not allow further inking. Thus, near the hinges 912, the user may not be able to seamlessly switch the pen from writing on one screen to the other because of the pen's inability to sync to the proper screen due to inter-screen interference from out-of-phase UL signals. A similar problem may arise for a single-screen device when another similar device is operating in its vicinity. For example, the pen operating on the original single-screen device may not be able to maintain its syncing with the device when faced with interfering UL signals from other nearby device(s).

Figure 10:
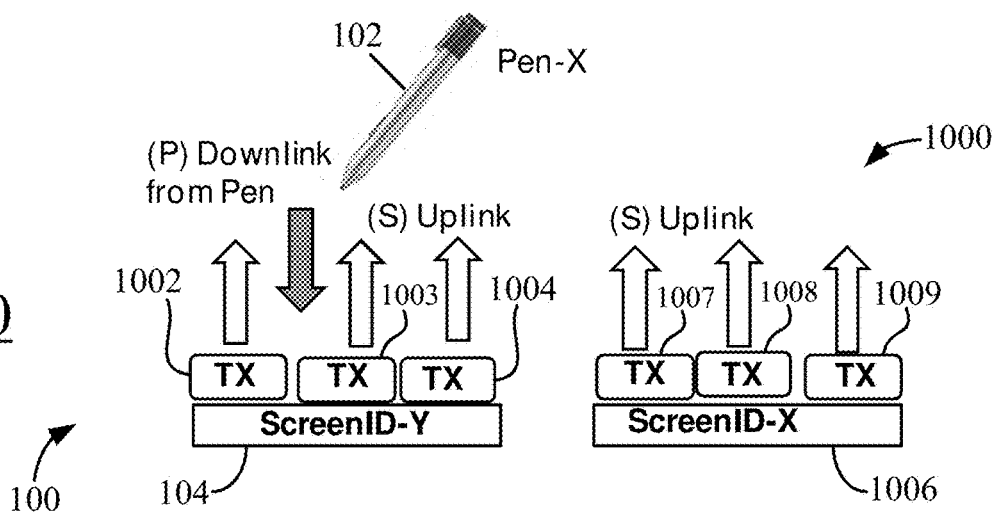
FIG. 10 illustrates 1-1 pairing between the single-screen computing device and the active pen of FIG. 1 as per particular embodiments of the present disclosure to enable the device-pen pair to operate free of interference from another similar device in the vicinity.

FIG. 10 illustrates 1-1 pairing between the single-screen computing device 100 and the active pen 102 of FIG. 1 as per particular embodiments of the present disclosure to enable the device-pen pair to operate free of interference from another similar device 1000 in the vicinity. As per teachings of the present disclosure, the existing active pen protocols may be extended to create (or support) screen ID and pen ID parameters that enable a pen and a screen to be one-to-one paired. As a result, each of them may ignore any other pen or screen presence in the vicinity and possible request(s) from such nearby unit(s) to "work" together. Like a device serial number, the screen ID parameter may be specific to (or uniquely-associated with) a touchscreen, and, similarly, the pen ID parameter may be uniquely-associated with a corresponding active pen. In particular embodiments, such IDs may be assigned (or allocated) to the computing devices and active pens at the time of their manufacture/assembly and may be stored internally within the unit. For example, the screen ID for the display screen 104 of the single-screen device 100 may be stored in the memory 302 or as part of the firmware of the screen sensor 306. On the other hand, the pen ID for the active pen 102 may be stored within the pen's controller (such as the controller 510 in FIG. 5). In other embodiments, a screen ID and/or a pen ID may be randomly generated at run-time by software, such as, for example, an operating system or other program code being executed in the computing device or active pen. In still other embodiments, an application may allow a user to select a screen ID and/or a pen ID, which may then remain stored in the corresponding unit's memory (or other storage location). Regardless of how these IDs may be created, stored, and managed, it is understood that the present disclosure relates to extending the existing active pen protocols to provide support for such IDs and their exchanges in the manner discussed later with reference to FIG. 12.

In FIGS. 10-15, the letter "S" is used to refer to screen-specific UL transmission(s), and the letter "P" is used to refer to pen-specific DL transmission(s). It is noted here that, for ease of discussion, a screen may be referred to as transmitting UL signals and receiving DL signals (from a pen). However, in particular embodiments, such screen-specific transmission/reception actually may be performed by a screen sensor (such as any of the screen sensors 306, 406, 420) via a transceiver (such as the transceiver 304 or 404) under operative control of the respective processor (such as the CPU 300 or 400). The transceiver may comprise one or more antennas (not shown) placed near or around the corresponding screen within the respective housing (such as the housing 106 or 206 or 208). These antenna(s) may be used to carry out screen-specific transmissions/receptions. Similarly, for ease of discussion, a pen may be referred to as transmitting DL signals and receiving UL signals (from a screen). However, it is understood that, in certain embodiments, such pen-specific transmission/reception may be performed by a controller (such as the controller 510 in FIG. 5) via a transceiver (such as the transceiver 514). The transceiver may comprise one or more antennas (not shown) placed within the body of the respective pen (such as the pen 102 or 202 or 204). These antenna(s) may be used to carry out pen-specific transmissions/receptions.

Referring back to FIG. 10, the screen 104 is shown to have "Screen ID-Y" as its screen-specific ID. This screen ID-Y may be sent (by the device 100) in the uplink during a pre-defined TX (transmission) timeslot. Three such exemplary timeslots 1002-1004 are shown in FIG. 10 by way of illustration only. The active pen 102 may have a "pen ID-X" as its pen-specific ID, which may be sent (by the pen) in the downlink during a pre-defined DL timeslot as discussed later with reference to FIG. 12, which also shows the timing relationship between UL and DL timeslots as per particular embodiments of the present disclosure. As a result of creation of these pen- and screen-specific IDs, the pen ID-X is enabled to pair with the screen ID-Y in a 1-1 pairing. Once paired, the active pen 102 may ignore any uplink data coming from other screen(s) of the device(s) operating in the vicinity. In case of the other single-screen device 1000 in FIG. 10, the active pen 102 may ignore its touchscreen's 1006 screen-specific ID (the "screen ID-X") transmitted in one or more of the TX timeslots 1007-1009. Likewise, a paired screen—such as the screen 104 in FIG. 10—may ignore/reject pen ID received from any other pen operating in its vicinity so long as the pen ID-X of the active pen 102 remains paired with the screen ID-Y of the screen 104. In this manner, an active pen may operate with a touchscreen device without being affected by interference from other device(s) or pen(s).

FIG. 11 shows 1-1 pairing between one of the screens 212 of the dual-screen computing device 200 and corresponding active pen 202 of FIG. 2 as per particular embodiments of the present disclosure to enable a screen-pen pair (the screen 212 and the pen 202) to operate free of interference from the other screen 214 of the device. In FIG. 11, the first screen 212 has the "screen ID-1" and the second screen 214 has the "screen ID-2" assigned thereto. The first screen 212 may transmit its screen ID-1 (indicated by the circled letter "S" in FIG. 11) in the exemplary uplink TX timeslots 1100-1102 and the second screen 214 may transmit its screen ID-2 (indicated by the circled letter "S" in FIG. 11) in the exemplary uplink TX timeslots 1104-1106. It is observed here that the dual-screen device 200 in FIG. 11 is in the double portrait flat mode, which may be defined as a single-pen orientation/orientation. As a result, each screen sensor 406, 420 in the computing device 200 may follow the sequential signaling shown in FIG. 12 (discussed later) and discussed earlier with reference to blocks 809-818 in FIG. 8. Thus, as discussed before with reference to block 809 in FIG. 8, in certain embodiments, initially, only the first screen 212 may transmit its screen ID-1 and wait for the pen's response. The active pen 202 may receive this screen ID-1 and may respond with its pen-specific ID (pen ID) in the downlink during a pre-defined DL timeslot, as discussed later with reference to FIG. 12. If the DL signal from the pen 202—shown by the circled letter "P" with a downward arrow in FIG. 11—indicates that the pen 202 has detected screen ID-1, the first screen sensor 406 may trigger the second screen sensor 420 to disable its upcoming transmissions of screen ID-2 in the timeslots 1104-1106. This prevention of transmission of screen ID-2 is illustrated by the cancellation mark (or the letter "X") on each UL signal associated with the timeslots 1104-1106. The first screen sensor 406 also may establish 1-1 pairing between the screen ID-1 and the pen ID (of the pen 202) received in the DL signal from the pen 202. As long as this 1-1 pairing remains established, the pen 202 and the first screen 212 may ignore other screen IDs or pen IDs, thereby facilitating an interference-free operation for the active pen 202. Furthermore, the disablement of transmission of the screen ID-2 from the second screen 214 provides an additional noise-free environment of operation for the active pen 202. In certain embodiments, this disablement may continue until the active pen 202 is in no longer 1-1 pairing with the first screen 212 as indicated, for example, by a trigger received by the second screen sensor 420 from the first screen sensor 406 as shown in FIG. 12 (discussed below).

FIG. 12 is an exemplary UL-DL timing diagram 1200 for the single-pen application in a dual-screen device, such as the device 200 in FIGS. 2 and 4, as per certain embodiments of the present disclosure. It is noted at the outset that the timing diagram 1200 of FIG. 12 may equally apply to a single-screen device, such as the device 100 of FIGS. 1 and 3, as discussed alter below. In the embodiment of FIG. 12, a pair of uplink I/O triggers 1202-1203 are shown. These triggers 1202-1203 may be exchanged between the first and the second screen sensors 406, 420 through the master/slave interface 422 in FIG. 4. In particular embodiments, the uplink I/O triggers 1202-1203 may be level-edged triggers, such as an ON/OFF command, and may be exchanged between the sensors 406, 420 in the form of a 2-wired handshaking signal. Thus, as shown in FIG. 14, so long as the Uplink_Input (Uplink_I) trigger 1202 from the second screen sensor 420 to the first screen sensor 406 remains asserted, it may indicate to the first screen sensor 406 to disable its transmission of the screen ID-1 (of the first screen 212). Similarly, so long as the Uplink_Output (Uplink_O) trigger 1203 from the first screen sensor 406 to the second screen sensor 420 remains asserted, it may indicate to the second screen sensor 420 to disable its transmission of the screen ID-2 (of the second screen 214), as in case of the embodiment in FIG. 11. In case of FIG. 12, the Uplink_I is shown to have been asserted first, indicating that the second screen sensor 420 may transmit the screen ID-2 in an UL signal during the pre-defined TX time slot 1205 having a duration of 2.5 ms. Thereafter, three successive time slots 1206-1208—each of 2.5 ms duration—may be dedicated to receive one or more DL signals from an active pen (for example, one of the active pens 202 or 204). Thus, each UL transmission of a screen ID may be followed by three successive timeslots (having a total of 7.5 ms interval) for receiving the pen ID. If a DL signal containing a pen ID is received in one of the timeslots 1206-1208, the second screen sensor 420 may attempt to establish 1-1 pairing with the received pen ID based on the signal strength of the DL signal and detected proximity of the pen, while continuing to assert the Uplink_I trigger 1202 to prevent the first screen sensor 406 from transmitting screen ID-1 that may cause interference.

If the pen doesn't detect the screen ID-2 (sent in the timeslot 1205)—as evidenced by lack of reception of pen ID during any of the time slots 1206-1208—or if the 1-1 pairing with the pen may not be established in the allotted 10 ms duration, the second screen sensor 420 may de-assert its Uplink_I trigger 1202. Substantially simultaneously, the first screen sensor 406 may assert the Uplink_O trigger 1203 and transmit the screen ID-1 in an UL signal during the pre-defined TX time slot 1210 having a duration of 2.5 ms. Thereafter, three successive time slots 1211-1213—each of 2.5 ms duration—may be dedicated to receive one or more DL signals from an active pen (for example, one of the active pens 202 or 204). In the context of FIG. 11, a DL signal containing the pen ID of the active pen 202 may be received in one of the timeslots 1211-1208, and the first screen sensor 406 may establish 1-1 pairing with the received pen ID based on the signal strength of the DL signal and detected proximity of the pen. In that case, the first screen sensor 406 also may continue to assert the Uplink_O trigger 1203 to prevent the second screen sensor 420 from transmitting screen ID-2 that may cause interference, as illustrated by the cancellation mark (or the letter "X") on each UL signal associated with the timeslots 1104-1106 in FIG. 11. In particular embodiments, if none of the screen sensors 406, 420 can establish a successful communication (or pairing) with an active pen during their corresponding 10 ms time interval, the ON/OFF signaling of the Uplink_I/O triggers 1202-1203 may be repeated every 10 ms in the time division manner illustrated in FIG. 12 until one of the screen sensors establishes a 1-1 pairing with an active pen.

Thus, in the timing arrangement 1200 of FIG. 12, no time-synchronization between uplink signals from the two screens 212, 214 may be required because only one uplink signal is allowed to be active at a time. In the embodiment of FIG. 12, a minimum of 7.5 ms (three "P" slots of 2.5 ms each) may be allotted every 10 ms for a pen's downlink communication with a screen sensor. On the other hand, 2.5 ms (one "S" slot) may be allotted every 10 ms for a sensor's uplink transmission. As noted before at block 808 in FIG. 8, in certain embodiments, a dual-screen computing device's orientation or orientation may determine whether the timing arrangement of FIG. 12 (for the single-pen application) may be implemented or the timing arrangement of FIG. 15 (for the dual-pen case) may be selected. As also mentioned before, data from various sensors in the sensor blocks 410-1 and 410-2 may be analyzed by the CPU 400 to determine the current orientation or orientation (and, hence, the current operating mode) of the dual-screen device 200. In particular embodiments, when a dual-screen computing device (such as the device 200 in FIG. 2) is detected to be in a specific operating mode associated with a single-pen application, the first screen sensor 406 may initially "instruct" the second screen sensor 420 (for example, through assertion of the Uplink_O trigger 1203) to disable its transmission of the UL signal containing the screen ID-2 of the second screen 214, as illustrated in the exemplary embodiment of FIG. 11. The specific operating mode may be one of the following: (i) the laptop mode, (ii) the 360° flip mode, (iii) the double portrait flat mode, or (iv) a mode other than the tent mode and the double landscape flat mode. As discussed later with reference to FIGS. 14-15, the tent mode and the double landscape flat mode may be associated with the dual-pen application. Various exemplary modes of operation are shown in FIG. 7.

It is noted here that the timing diagram 1200 in FIG. 12 may equally apply to a single-screen device, such as the device 100 in FIG. 1. In case of a single-screen device, the Uplink_I/O triggers 1202-1203 may be absent. Instead, in certain embodiments, the screen sensor—such as the screen sensor 306 in FIG. 3—of the device may simply follow the time-slot arrangement illustrated in the timing diagram 1200. In other words, the screen sensor 306 may transmit the screen ID of the device's single screen (such as the screen 104 in FIG. 1) in the UL using the "S" time slots 1205, 1210, and so on, and may wait for three "P" time-slots (each of 2.5 ms duration) after each "S" slot to receive one or more DL signals from the nearby active pen (such as the pen 102 in FIG. 1) containing pen ID and, possibly, other data. This process may be repeated every 10 ms as shown in the timing diagram 1200 to establish and maintain 1-1 pairing with the active pen 102. As mentioned before, the screen sensor 306 may ignore other pen IDs received in the "P" time slots while the 1-1 pairing with the active pen 102 is in effect. Similarly, the pen 102 may ignore other screen IDs while the 1-1 pairing with the screen 104 is in effect.

FIGS. 13A-13B illustrate two additional single-pen orientations for the dual-screen computing device 200 of FIG. 2 in which the trigger-based timing of FIG. 12 may be used to enable a screen-pen pair (for example, the first screen 212 and the active pen 202) to operate free of interference from the other screen 214 of the device as per particular embodiments of the present disclosure. As discussed with reference to FIG. 12 earlier, a dual-screen device may be in a specific operating mode associated with a single-pen application. In FIG. 13A, the device 200 is shown to be in the laptop mode, whereas in FIG. 13B, the device 200 is shown to be in the 360° flip mode. In certain embodiments, as mentioned before, both of these operating modes qualify the device 200 for the single pen orientation at block 808 in FIG. 8. As a result, the screen sensors 406, 420 in the device 200 may implement (under the operative control of the CPU 400) the earlier-discussed timing arrangement of FIG. 12. As a result, the first screen sensor 406 may trigger the second screen sensor 420 to disable its upcoming transmissions of screen ID-2 as illustrated by the cancellation mark (or the letter "X") on the respective UL signals 1300, 1302 in FIGS. 13A-13B. The first screen sensor 406 also may establish 1-1 pairing between the screen ID-1 and the pen ID (of the pen 202) received in the DL signal from the pen 202, as discussed before with reference to FIGS. 11-12. For ease of illustration, detailed annotations—like those in FIG. 11—are not provided in FIGS. 13A-13B. Furthermore, for the sake of brevity, a detailed discussion of FIGS. 13A-13B is also not provided in view of the detailed discussions of FIGS. 11-12, which remain applicable to the configurations in FIGS. 13A-13B as well.

Figure 14A:
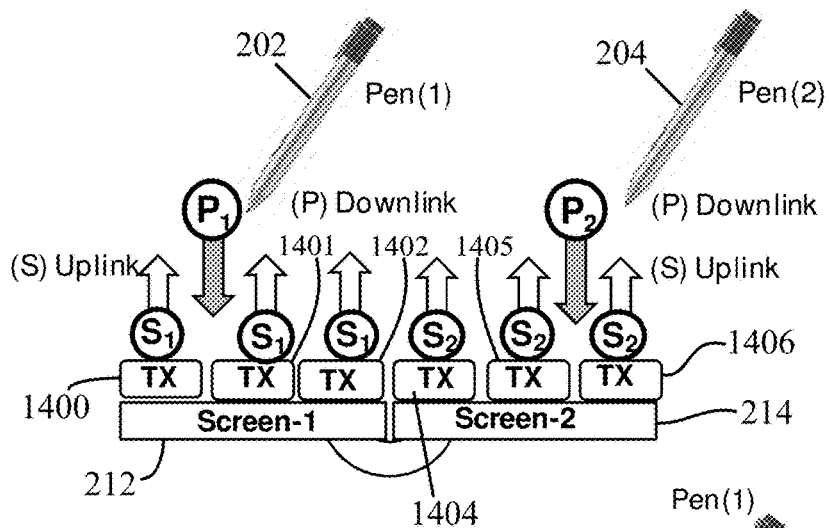
FIGS. 14A-14B show dual-pen orientations for the dual-screen computing device of FIG. 2 in which the interlaced timing of FIG. 15 may be used to enable simultaneous operation of two active pens—one on each screen of the computing device—as per certain embodiments of the present disclosure.
Figure 14B:
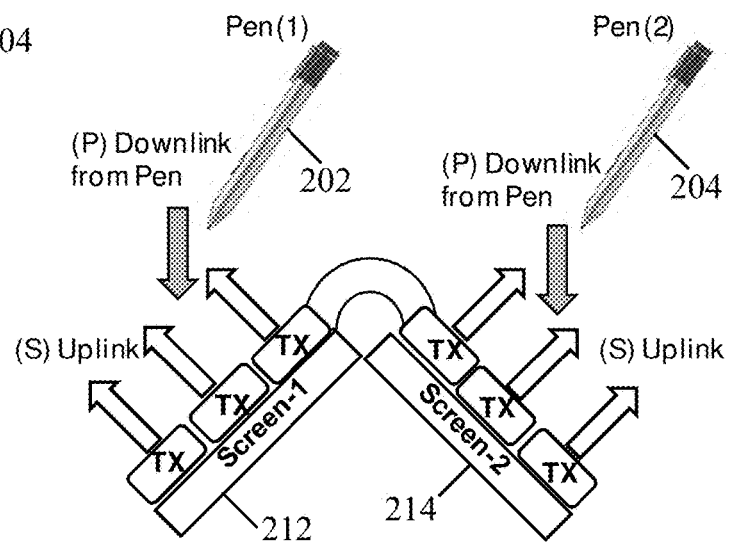

FIGS. 14A-14B show dual-pen orientations for the dual-screen computing device 200 of FIG. 2 in which the interlaced timing of FIG. 15 (discussed later) may be used to enable simultaneous operation of two active pens—one on each screen of the computing device—as per certain embodiments of the present disclosure. As shown in FIGS. 14A-14B, the active pen 202 may be 1-1 paired with the first screen 212 and the active pen 204 may be 1-1 paired with the second screen 214. The pen-screen pairing may be accomplished using the interleaved UL-DL signaling discussed later with reference to FIG. 15. As noted before at block 808 in FIG. 8, in certain embodiments, a dual-screen computing device's orientation or orientation may determine whether the timing arrangement of FIG. 15 (for the dual-pen case) may be selected. As also mentioned before, data from various sensors in the sensor blocks 410-1 and 410-2 may be analyzed by the CPU 400 to determine the current orientation or orientation (and, hence, the current operating mode) of the dual-screen device 200. In particular embodiments, when a dual-screen computing device (such as the device 200 in FIG. 2) is detected to be in a specific operating mode defined for dual-pen application, the first screen sensor 406 may "instruct" the second screen sensor 420 to follow the interlaced timing discussed later with reference to the exemplary timing diagram of FIG. 15. The specific operating mode that can support the dual-pen application may be one of the following: (i) the double landscape flat mode in FIG. 14A, and (ii) the tent mode in FIG. 14B. Various exemplary modes of operation are shown in FIG. 7.

In particular embodiments, upon detection of the current orientation of the dual-screen device 200, the host OS (in the computing device 200) may set the respective screen sensors 406, 420 in the dual-pen mode under operative control of the CPU 400. This action may be automatic. In other embodiments, the single-pen mode may be the default mode for the device 200, and, when the device orientation can support simultaneous operations of two active pens, the user may be given an option whether to turn on the dual-pen mode for the device 200 or to keep the device 200 in the default, single-pen mode. Instead of the OS, an application may be provided, which, upon execution by the CPU 400, may guide the user as to the selection of the desired pen mode—single-pen or dual-pen—depending on the current orientation of the device 200.

In FIGS. 14A-14B, the first screen 212 has the "screen ID-twin-1" and the second screen 214 has the "screen ID-twin-2" assigned thereto. As mentioned earlier with reference to discussion of block 821 in FIG. 8, these two screen IDs may be related to (or derived from) each other, enabling a pen to discriminate the possible screen ID emitted in the UL by another device in the proximity. In particular embodiments, in case of a dual-screen device (such as the device 200), the screen ID-twin-1 and the screen ID-twin-2 may be used in the dual-pen mode and may be in addition to (and different from) the earlier-discussed screen ID-1 and screen ID-2 for the single-pen application. The creation and definition of screen ID-twin-1 and screen ID-twin-2 may inform an active pen that it is approaching a dual-screen device and will be exposed to two UL signals in a specific timing pattern (such as the interlaced timing of FIG. 15). It is noted here that the active pen may be configured to comply with these extensions to the existing active pen protocols so that the pen can follow the proper timing requirements (for example, as shown in FIGS. 12 and 15), detect and process various screen ID parameters, and respond accordingly.

Referring now to FIG. 14A, the first screen 212 may transmit its screen ID-twin-1 (indicated by the circled letter "S₁" in FIG. 14A) in the exemplary uplink TX timeslots 1400-1402 and the second screen 214 may transmit its screen ID-twin-2 (indicated by the circled letter "S₂" in FIG. 14A) in the exemplary uplink TX timeslots 1404-1106. These screen ID-twin parameters may be sent by respective screen sensors 406, 420 in the corresponding interlaced UL signals, as discussed later with reference to FIG. 15. Each active pen 202, 204 may receive one or both of these screen ID-twin parameters and may recognize that it is approaching a dual-screen device. In response, each controller (such as the controller 510 in FIG. 5) in the respective pen 202, 204 may respond with its pen-specific ID—the pen ID-1 for the pen 202 (indicated by the circled letter "P1") and pen ID-2 for the pen 204 (indicated by the circled letter "P2" in FIG. 14A)—in the downlink during a pre-defined DL timeslot, as discussed later with reference to FIG. 15.

Each of the first screen sensor 406 and the second screen sensor 420 may receive the pen ID-1 (of the active pen 202) and/or the pen ID-2 (of the active pen 204) in the pen-specific DL signals. As discussed later with reference to FIG. 15, these pen IDs may be received in the timeslots interleaved with the screen ID-twin (screen ID-twin-1 and screen ID-twin-2) timeslots in the UL. In particular embodiments, based on the strength of the DL signal (containing the pen ID-1) received from the active pen 202 and the detected proximity of the pen 202 and the first display screen 212, the first screen sensor 406 may establish a 1-1 pairing between the screen ID-twin-1 and the pen ID-1 (of the pen 202) received in the DL signal from the pen 202. Similarly, in certain embodiments, based on the strength of the DL signal (containing the pen ID-2) received from the active pen 204 and the detected proximity of the pen 204 and the second display screen 214, the second screen sensor 420 may establish a 1-1 pairing between the screen ID-twin-2 and the pen ID-2 (of the pen 204) received in the DL signal from the pen 204. As long as this 1-1 pairing remains established, each linked pen-screen pair may ignore other screen IDs or pen IDs, thereby facilitating simultaneous operation of two active pens 202, 204 on the computing device 200 in an interference-free manner.

For ease of illustration and to avoid clutter, detailed annotations—like those in FIG. 14A—are not provided in FIG. 14B, where the dual-screen device 200 is shown in the tent mode. Furthermore, for the sake of brevity, a detailed discussion of FIG. 14B is also not provided in view of the detailed discussion of FIG. 14A, which remains applicable to the tent configuration in FIG. 14B as well.

Figure 15:
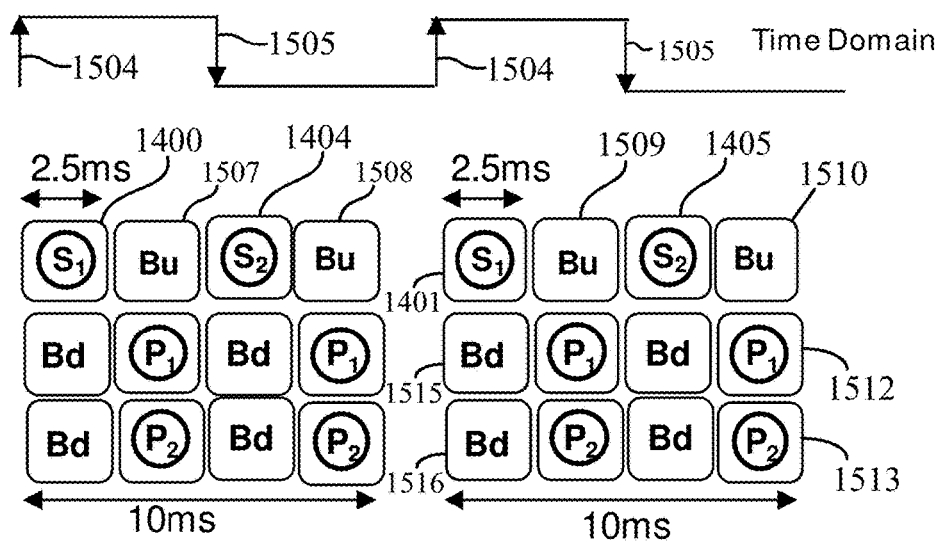
FIG. 15 is an exemplary UL-DL timing diagram for the dual-pen application in a dual-screen device as per particular embodiments of the present disclosure.

FIG. 15 is an exemplary UL-DL timing diagram 1500 for the dual-pen application in a dual-screen device, such as the device 200 in FIGS. 2 and 4, as per particular embodiments of the present disclosure. In the embodiment of FIG. 15, upon receiving a notification (for example, by the CPU 400) that the device 200 orientation qualifies for the dual-pen application, the master screen sensor 406 may generate and send a synchronization signal (or "sync signal") 1502 to the slave screen sensor 420 to establish a time synchronization between their respective UL transmissions (resulting in only one UL active at a time). The synchronization signal 1502 also prepares the screen sensors 406, 420 to receive the DL signals from the active pens 202, 204 interleaved with their UL signals, in a fully time-synchronized manner. For ease of reference, the TX timeslots in FIGS. 14A and 15 are identified using the same reference numerals. Thus, as shown in FIG. 15, the master screen sensor 406 may send (to the slave screen sensor 420) a rising edge 1504 of the sync signal 1502 substantially simultaneously with the master's UL transmission in the TX timeslot 1400 (having a pre-defined 2.5 ms duration). The UL transmission from the master 406 (in the timeslot 1400) may contain the screen ID-twin-1 of the first screen 212. In one embodiment, the rising edge 1504 may prevent the slave screen sensor 420 from sending its UL transmission (containing screen ID-twin-2). Hence, potential interference between the UL transmissions of the screen sensors 406, 420 may be avoided.

After 5 ms (equal to two timeslots of 2.5 ms each) have elapsed since the commencement of the TX time slot 1400 (or transmission of the rising edge 1504), the master 406 may invert the sync signal 1502 and send the inverted edge 1505 to the slave 420. The inverted edge 1505 may "instruct" the slave 420 to send its UL for 2.5 ms. Thus, as shown in FIG. 15, the slave screen sensor 420 may send its UL transmission in the TX timeslot 1404 (having a pre-defined 2.5 ms duration) substantially simultaneously with the reception of the inverted edge 1505 from the master 406. The UL transmission from the slave 420 (in the timeslot 1404) may contain the screen ID-twin-2 of the second screen 214. In one embodiment, the falling edge 1505 may prevent the master 406 from sending its UL transmission (containing screen ID-twin-1). Hence, potential interference between the UL transmissions of the screen sensors 406, 420 may be avoided. As shown in FIG. 15, each "Bu" timeslot 1507-1510 is a blank timeslot (of 2.5 ms duration) that may be "inserted" in the uplink between each pair of "S₁" and "S₂" timeslots, such as the timeslots 1400, 1404, 1401, and so on. No UL transmission (from either of the screen sensors 406, 420) may occur during the Bu timeslots 1507-1510.

As mentioned before, the creation of the screen ID-twin parameters may inform an active pen that it is approaching a dual-screen device. For example, when the first active pen 202 receives the screen ID-twin-1 transmitted in the UL timeslot 1400 from the first screen 212, the pen 202 will expect to receive the screen ID-twin-2 from the second screen 214 within 5 ms interval from the timeslot 1400, followed by another reception of the screen ID-twin-1 in the next 5 ms interval, and so on, as shown in FIG. 15. It is understood that the active pen may have been configured to receive and process various UL signals (shown, for example, in FIGS. 12 and 15) transmitted as per teachings of the present disclosure and may provide its response in compliance with the corresponding timing protocols. Thus, in the context of FIG. 15, each active pen 202, 204 may know that it will have to comply with the interlaced timing arrangement 1500 when transmitting its DL signals. This compliance by the active pens 202, 204 may assure correct operations when the pens are used simultaneously, mitigating possible interferences between the pens 202, 204 and the screen sensors 406, 420.

As shown in the timing diagram 1500, for every 10 ms of time interval, a total of two time slots—the "Bu" timeslots 1507-1508—may be dedicated to receive DL signals from the active pens 202, 204. Furthermore, in the embodiment of FIG. 15, the pen downlinks (from one or both of the pens 202, 204), when active, may occur during the same timeslots. For ease of illustration, only two such DL signals 1512-1513 are identified in FIG. 15. The downlink "$P_1$" from the first active pen 202 may contain the pen ID-1 of the pen 202, and the downlink "$P_2$" from the second active pen 204 may contain the pen ID-2 of the pen 204. As can be seen from FIG. 15, both of these downlinks 1512-1513 occur during the same timeslot 1510. Even if the pen downlinks occur during a common timeslot, there may be no interference between pen downlinks because the energy involved in the transmission from a pen is small. In contrast to the shared downlinks of pens, the situation may be different for the uplinks where more energy is sent from the screen sensors 406, 420. Therefore, in the embodiment of FIG. 15, both screen sensors do not send their uplinks at the same time. In order to avoid interferences between the UL-DL signals from each screen-pen pair, the two screen uplinks ("$S_1$" and "$S_2$") in the timeslots 1400, 1404 may be interleaved with the two pen timeslots 1507, 1508 during every 10 ms time interval, as shown in FIG. 15. Therefore, two active pens 202, 204 may be used simultaneously—one on each screen—without causing inconsistent inking near the center gap of the device 200 (that is, at screen locations near the hinges connecting the two screens 212, 214 of the device 200).

As noted with reference to discussion of FIG. 14A, each of the first screen sensor 406 and the second screen sensor 420 may receive the pen ID-1 (of the active pen 202) and/or the pen ID-2 (of the active pen 204) in the pen-specific DL signals ("$P_1$" and "$P_2$"). As shown in FIG. 15, these DL signals may be received in the timeslots 1507-1510 interleaved with the UL timeslots 1400, 1404, and so on. The first screen sensor 406 may establish a 1-1 pairing between the screen ID-twin-1 and the pen ID-1 (of the pen 202) and the second screen sensor 420 may establish a 1-1 pairing between the screen ID-twin-2 and the pen ID-2 (of the pen 204) received in the DL signal from the pen 204. As long as this 1-1 pairing remains established, each linked pen-screen pair may ignore other screen IDs or pen IDs, thereby facilitating simultaneous operation of two active pens 202, 204 on the computing device 200 in an interference-free manner. It is noted here that, each "Bd" timeslot (such as the timeslots 1515-1516) shown in FIG. 15 is a blank timeslot (of 2.5 ms duration) associated with a corresponding UL timeslot 1400, 1404, and so on. The Bd timeslots are shown in FIG. 15 to illustrate that no DL transmission (from either of the pens 202, 204) may occur during the Bd timeslots. As a result of the Bu and Bd timeslots, the UL signals may be transmitted in synchronization and the DL signals may be received in the interleaved manner shown in FIG. 15. In certain embodiments, the master-slave interface 422 may support such timings.

In particular embodiments, the single- and dual-pen applications discussed herein with reference to the timing diagrams in FIGS. 12 and 15, respectively, may be implemented in a computing device (through a single screen sensor 306 or the master-slave pair 406, 420, as appropriate) in an OS-agnostic manner. For example, in certain embodiments, the master-slave interface 422 (FIG. 4) and extensions to the existing active pen protocols (illustrated in the exemplary timing diagrams of FIGS. 12 and 15) may not be visible to the host platform's OS or Basic Input-Output System (BIOS). In some embodiments, the functionality of the master-slave interface 422 may be implemented through appropriate firmware extensions in the screen sensors 406, 420. However, the host OS (for example, the OS in the dual-screen device 200) may support allowing simultaneous inputs from two pens to the system.

Figure 16:
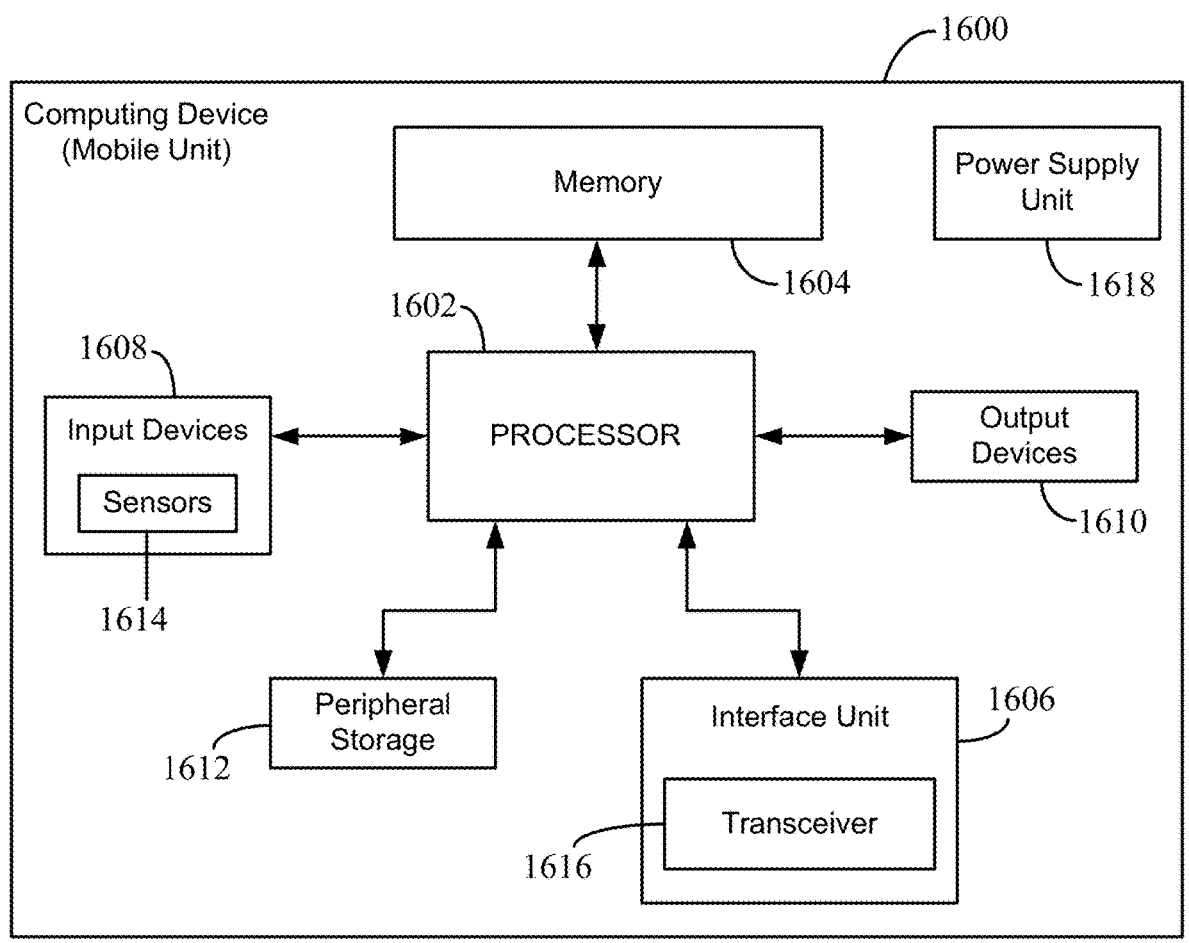
FIG. 16 illustrates an example configuration of a computing device (or mobile unit) that can be used to implement the systems and techniques described herein.

FIG. 16 illustrates an example configuration of a computing device (or mobile unit) 1600 that can be used to implement the systems and techniques described herein. In particular embodiments, the computing device 1600 may be the device 100 shown in FIG. 1, 3 or the device 200 shown in FIGS. 2, 4. Based on where the computing device 1600 is a single-screen device or a dual-screen device, the computing device 1600 may be suitably configured to implement the interference-free support for single and dual pen applications according to the teachings of the present disclosure. The computing device 1600 may include one or more processors 1602, a memory unit 1604, an interface unit 1606 providing communication interfaces, one or more input devices 1608, one or more output devices 1610, and a peripheral storage unit 1612, connected to the processor 1602 as shown and configured to communicate with each other, such as via one or more system buses (not shown) or other suitable connection.

In one embodiment, the input devices 1608 may provide data inputs—such as user input selecting a wireless mode, camera images, sensor data, and the like—to the processor 1602 for further processing. A sensor unit 1614, such as the sensor block 310 in FIG. 3 or the sensor block 410 in FIG. 4, may form a part of the input devices 1608. In one embodiment, the sensor unit 1614 may be a combination of a sensor block and a sensor hub (such as the sensor hub 308 in FIG. 3 or the sensor hub 408 in FIG. 4). Other input devices 1608 may include, for example, a touchpad, a camera, a Global Positioning System (GPS) sensor, a computer keyboard, a touch-screen, a joystick, a physical or virtual "clickable button," a computer mouse/pointing device, and the like. A display screen is an example of the output device 1610. In the embodiments of FIGS. 1-2, the display screens 104, 212, 214, and corresponding screen sensors 306, 406, 420, may function as both an input device 1608 as well as an output device 1610. Other examples of an output device include a graphics/display device, a computer screen or monitor, an alarm system, or any other type of data output device. In some embodiments, the input device(s) 1608 and the output device(s) 1610 may be coupled to the processor 1602 via an I/O or peripheral interface(s). In some embodiments, the computing device 1600 may include more than one instance of the components shown. In various embodiments, all of the components shown in FIG. 16 may be housed within a single housing (for example, the housing 106 in FIG. 1) or within two housings hinged together (for example, the housings 206, 208 on FIG. 2). In other embodiments, the computing device 1600 may not include all of the components shown in FIG. 16. Furthermore, the computing device 1600 may be configured as a standalone system, as a server system, as a client system, or in any other suitable form factor.

The processor 1602 is a hardware device that may include a single processing unit or a number of processing units, all of which may include single or multiple computing units or multiple cores. In one embodiment, the processor 1602 may be the CPU 300 shown in FIG. 3 or the CPU 400 shown in FIG. 4 depending on the device type—single-screen or dual-screen. In some embodiments, the processor 1602 may include the functionality of a corresponding screen sensor(s), such as the screen sensor 306 or the pair of master/slave screen sensors 406, 420. When the computing device 1600 is a multiprocessor system, there may be more than one instance of the processor 1602 or there may be multiple processors coupled to the processor 1602 via their respective interfaces (not shown). The processor 1602 may include an integrated Graphics Processing Unit (GPU) or the GPU may be a separate processor device in the mobile unit 1600. The processor 1602 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 1602 may be configured to fetch and execute computer-readable instructions stored in the memory 1604, the peripheral storage 1612, or other computer-readable media. In some embodiments, the processor 1602 may be a System on Chip (SoC).

When the single or dual active pen support functionality as per teachings of the present disclosure is implemented as a combination of hardware and software, the relevant hardware or digital logic circuits and associated microcode may be implemented as part of the processor unit 1602 and/or through the combination of the components 1608, 1610. The relevant hardware may communicate with a corresponding software (discussed below) in the memory unit 1604 to cause the processor 1602 (or appropriate screen sensor(s)) to perform various device-specific operations discussed before with reference to the embodiments in FIGS. 1-8 and 10-15. In some embodiments, as noted before, the screen sensors may be implemented as separate unit(s) connected to various circuit components and the processor 1602, similar to the configuration shown in FIGS. 3-4. Generally, in particular embodiments, the single- and dual-pen support methodologies discussed with reference to FIGS. 1-8 and 10-15 may be considered to be provided by the computing device 1600 when relevant program code is executed by the processor 1602.

The memory 1604 and the peripheral storage unit 1612 are examples of non-transitory computer media (e.g., memory storage devices) for storing instructions that can be executed by the processor 1602 to perform the various functions described herein. For example, the memory unit 1604 may include both volatile memory and non-volatile memory (e.g., RAM, ROM, or the like). Further, in particular embodiments, the peripheral storage unit 1612 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. In some embodiments, the memory 1604 may be the memory 302 in FIG. 3 or the memory 402 in FIG. 4, depending on the device configuration. Both memory 1604 and mass storage devices constituting the peripheral storage 1612 may be collectively referred to as memory or computer storage media herein, and may be a media capable of storing computer-readable, processor-executable program instructions as computer program code that can be executed by the processor 1602 as a particular machine configured for carrying out the operations and functions described in the implementations herein.

As mentioned before, in some embodiments, the single- and dual-pen support methodologies discussed herein may be implemented in software or as a combination of hardware and software. In that case, the software may be a part of the memory 1604 of the computing device 1600. In other embodiments, the software may be a part of the peripheral storage 1612. Generally, the program instructions constituting the software may form a part of the memory unit 1604 and/or the peripheral storage 1612 for execution by the processor 1602. When the processor 1602 includes the hardware for the relevant screen sensor(s) (for example, the screen sensor 306 or the pair of screen sensors 406, 420) or when a screen sensor portion (implementing the screen sensor 306 or the pair of screen sensors 406, 420 depending on whether the device 1600 is a single-screen or a dual-screen device) is a separate hardware component of the computing device 1600, the software may be executed by the corresponding screen sensor hardware with or without the help of additional processing resources in the processor 1602 and/or the Operating System (OS) for the computing device 1600.

The computing device 1600 may also include one or more communication interfaces as part of its interface unit 1606 for exchanging data or other digital content. Such exchange may be carried out via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, ZigBee®, Wireless USB, cellular, satellite, etc.), the Internet and the like. Communication interfaces in the interface unit 1606 can also provide communication with external storage (not shown), such as in a storage array, cloud storage, network attached storage, storage area network, one or more databases, or the like. In particular embodiments, the interface unit 1606 may include transceiver functionality as indicated by the block 1616 in FIG. 16. The transceiver block 1616 may be similar to the transceiver unit 304 in FIG. 3 (in case the device 1600 is a single-screen device) or the transceiver unit 404 in FIG. 4 (in case the device 1600 is a dual-screen device).

The computer storage media, such as the memory 1604 and the mass storage devices in the peripheral storage 1612, may be used to store software and data. For example, the computer storage media may be used to store the operating system (OS) for the computing device 1600, various device drivers for the device 1600, and the data such as audio content, video content, text data, streaming content, or any other type of content. The computer storage media also may store software applications such as a word processing application, a spreadsheet application, and the like. The program code—for example, for the software applications, the OS, and so on—may be executed by the processor 1602. In one embodiment, a non-transitory, computer-readable data storage medium, such as, for example, the system memory 1604 or the peripheral data storage unit 1612 may store the program code or software used to implement the single- and dual-pen support methodologies discussed herein. In some embodiments, such program code may operate in conjunction with the host OS. The processor 1602 may be configured to execute the program code to implement all or some of the teachings of the present disclosure, whereby the computing device 1600 may be operative to perform various device-specific tasks as per the teachings of the present disclosure. In one embodiment, such tasks may include, for example, the process steps illustrated in FIGS. 6 and 8. The program code that implements all or a portion of the teachings of the present disclosure may be proprietary software or open source software which, upon execution by the processor 1602, may enable the computing device 1600 to perform operations to provide the interference-free support for single-pen application, dual-pen application, or both, as per teachings of the present disclosure.

In particular embodiments, the computing device 1600 may include an on-board power supply unit 1618 to provide electrical power to various system components illustrated in FIG. 16. The power supply unit 1618 may receive batteries or may be connectable to an AC electrical power outlet. In one embodiment, the power supply unit 1618 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computing device comprising:
a first touch-sensitive display screen operable to allow a first user to interact therewith using a first active pen having a first pen ID specific to the first active pen;
a first screen sensor operatively coupled to the first touch-sensitive display screen to sense and analyze user inputs received through the first active pen, wherein:
the first screen sensor is operable to wirelessly transmit a first screen ID specific to the first touch-sensitive display screen to the first active pen using a first Uplink (UL) signal; and
wirelessly receive the first pen ID in a first Downlink (DL) signal from the first active pen, thereby establishing a one-to-one pairing between the first active pen and the first touch-sensitive display screen;
a second touch-sensitive display screen operable to allow a second user to interact therewith using a second active pen having a second pen ID specific to the second active pen; and
a second screen sensor operatively coupled to the second touch-sensitive display screen and to the first screen sensor, wherein the second screen sensor is operable to:
sense and analyze user inputs received via the second active pen;
wirelessly transmit a second screen ID that is specific to the second touch-sensitive display screen and is related to the first screen ID, to the second active pen using a second UL signal, and
wirelessly receive the second pen ID in a second DL signal from the second active pen during a time that the computing device is in one of a plurality of operating modes, thereby establishing a one-to-one pairing between the second active pen and the second touch-sensitive display screen.

2. The computing device of claim 1, wherein the first UL signal is transmitted during a first pre-defined time slot and the first DL signal is received during a second pre-defined time slot, and wherein the first screen sensor is operable to receive multiple first DL signals in succession following each transmission of the first UL signal.

3. The computing device of claim 2, wherein:
the first pre-defined time slot has a duration of 2.5 milliseconds (ms),
the second pre-defined time slot has a duration of 2.5 ms, and
the first screen sensor is operable to receive three successive first DL signals in corresponding second pre-defined time slots following each transmission of the first UL signal.

4. The computing device of claim 1, wherein the first screen sensor is operable to ignore another pen ID received from an active pen other than the first active pen while the one-to-one pairing remains established.

5. The computing device of claim 1, wherein:
the second screen sensor is operable to wirelessly transmit the second screen ID specific to the second touch-sensitive display screen using the second UL signal based on a trigger received from the first screen sensor,
the trigger causes transmission of the second UL signal to be delayed until a first pre-defined time period has elapsed from conclusion of transmission of the first UL signal, and
the first screen sensor is operable to wait for a second pre-defined time period after conclusion of transmission of the second UL signal before transmitting another first UL signal.

6. The computing device of claim 5, wherein each of the first and the second pre-defined time periods is of 7.5 ms duration, and wherein the first screen sensor is operable to instruct the second screen sensor to disable transmission of the second UL signal when the computing device is in one of a plurality of operating modes.

7. The computing device of claim 6, wherein the plurality of operating modes comprises the following:
a laptop mode;
a 360° flip mode;
a double portrait flat mode; and
a mode other than a tent mode and a double landscape flat mode.

8. The computing device of claim 1, wherein the plurality of operating modes comprises the following:
a tent mode; and
a double landscape flat mode.

9. The computing device of claim 1, wherein:
the first UL signal is transmitted during a first pre-defined time period,
the second UL signal is transmitted during a second pre-defined time period,
a third pre-defined time period occurs after the first pre-defined time period,
a fourth pre-defined time period occurs after of the second pre-defined time period, and
the first screen sensor is operable to receive the first DL signal during at least one of the third or the fourth pre-defined time periods, and
the second screen sensor is operable to receive the second DL signal during at least one of the third or the fourth pre-defined time periods.

10. The computing device of claim 9, wherein each of the first, the second, the third, and the fourth pre-defined time periods is of 2.5 ms duration.

11. A computing device comprising:
a first touch-sensitive display screen operable to allow a first user to interact therewith using a first active pen having a first pen ID specific to the first active pen;
a second touch-sensitive display screen movably attached to the first touch-sensitive display screen and operable to allow a second user to interact therewith using a second active pen while the first user is interacting with the first touch-sensitive display screen, the second active pen having a second pen ID specific to the second active pen;
a first screen sensor operatively coupled to the first touch-sensitive display screen to sense and analyze user inputs received through the first active pen, wherein the first screen sensor is operable to wirelessly transmit a first screen ID specific to the first touch-sensitive display screen to the first active pen using a first Uplink (UL) signal and wirelessly receive the first pen ID in a first Downlink (DL) signal from the first active pen, thereby establishing a one-to-one pairing between the first active pen and the first touch-sensitive display screen; and
a second screen sensor operatively coupled to the second touch-sensitive display screen to sense and analyze user inputs received through the second active pen, wherein the second screen sensor is operable to wirelessly transmit a second screen ID specific to the second touch-sensitive display screen to the second active pen using a second UL signal and wirelessly receive the second pen ID in a second DL signal from the second active pen, thereby establishing a one-to-one pairing between the second active pen and the second touch-sensitive display screen.

12. The computing device of claim 11, wherein:
the first and the second screen IDs are related to each other, and
the first and the second screen IDs are transmitted through the respective first and second UL signals having a pre-defined timing relationship therebetween.

13. An active pen comprising:
a transceiver to wirelessly communicate with a first touch sensitive display screen having touch sensitivity; and
a controller coupled to the transceiver, wherein the controller is operable to:
wirelessly transmit a pen ID specific to the active pen through the transceiver to the first display screen using a Downlink (DL) signal,
wirelessly receive through the transceiver a first screen ID specific to the first display screen in a first Uplink (UL) signal from the first display screen, to establish a one-to-one pairing between the active pen and the first display screen,
ignore a second screen ID received through the transceiver in a second UL signal from a second display screen in a vicinity of the active pen while the one-to-one pairing remains established, the second display screen having touch sensitivity;
determine, based on the first screen ID, that the first display screen and the second display screen are part of a dual-screen computing device;
receive the first UL signal during a first pre-defined time slot;
receive the second UL signal during a second pre-defined time slot; and
transmit the DL signal during a third pre-defined time slot occurring between the first and the second pre-defined time slots.

14. The active pen of claim 13, wherein the controller is operable to:
receive the first UL signal during the first pre-defined time slot; and
responsively transmit three DL signals in succession, wherein each DL signal is transmitted during a corresponding second pre-defined time slot.

15. The active pen of claim 13, wherein:
the first pre-defined time slot has a duration of 2.5 milliseconds (ms); and
the second pre-defined time slot has a duration of 2.5 ms.

16. A method comprising:
wirelessly transmitting, by a computing device having dual screens, a first screen ID specific to a first touch-sensitive display screen of the computing device;
wirelessly transmitting, by the computing device, a second screen ID specific to a second touch-sensitive display screen of the computing device, wherein the second screen ID is related to the first screen ID;
wirelessly receiving, by the computing device, a first pen ID specific to a first active pen in vicinity of the computing device;
wirelessly receiving, by the computing device, a second pen ID specific to a second active pen in vicinity of the computing device;
linking, by the computing device, the first screen ID with the first pen ID to establish a one-to-one pairing between the first active pen and the first touch-sensitive display screen;

linking, by the computing device, the second screen ID with the second pen ID to establish a one-to-one pairing between the second active pen and the second touch-sensitive display screen; and disabling, by the computing device, transmission of the second touch-sensitive display screen based at least in part on determining that the computing device has an orientation comprising one of:
- a laptop orientation,
- a 360° flip orientation,
- a double portrait flat orientation, or
- a particular orientation that is different than either a tent mode or a double landscape flat mode.

17. The method of claim 16, further comprising:

wirelessly transmitting, by the computing device, the first screen ID during a first pre-defined time slot;

wirelessly transmitting, by the computing device, the second screen ID during a second pre-defined time slot; and wirelessly receiving, by the computing device, at least one of the first pen ID and the second pen ID during a third pre-defined time slot occurring between the first and the second pre-defined time slots.

18. The method of claim 17, wherein:

the first pre-defined time slot has a duration of 2.5 milliseconds (ms), and the second pre-defined time slot has a duration of 2.5 ms.

19. The method of claim 16, wherein:

the first touch-sensitive display screen ignores a third pen ID received from a third active pen that is different from the first active pen during a time that the one-to-one pairing between the first active pen and the first touch-sensitive display screen remains established.

20. The method of claim 16, further comprising:

wirelessly transmitting, by a first screen sensor associated with the first touch-sensitive display screen, a first screen ID associated with the first touch-sensitive display screen to the first active pen using a first Uplink (UL) signal; and wirelessly transmitting, by a second screen sensor associated with the second touch-sensitive display screen, a second screen ID associated with the second touch-sensitive display screen to the second active pen using a second UL signal.

* * * * *

UNITED STATES PATENT AND TRADEMARK OFFICE
CERTIFICATE OF CORRECTION

PATENT NO. : 10,719,145 B1
APPLICATION NO. : 16/398609
DATED : July 21, 2020
INVENTOR(S) : Jace W. Files, Yung-Chun Liu and Gerald R. Pelissier Page 1 of 1

It is certified that error appears in the above-identified patent and that said Letters Patent is hereby corrected as shown below:

In the Claims

Please correct Claim 13, Column 36, Line 11, delete the words "touch sensitive" after the word "first"

Signed and Sealed this
Fifteenth Day of September, 2020

Andrei Iancu
*Director of the United States Patent and Trademark Office*